United States Patent
Lynch et al.

(10) Patent No.: US 7,241,561 B1
(45) Date of Patent: Jul. 10, 2007

(54) PHOTOTHERMOGRAPHIC REDUCING AGENTS WITH BICYCLIC OR TRICYCLIC SUBSTITUTION

(75) Inventors: Doreen C. Lynch, Afton, MN (US); William D. Ramsden, Afton, MN (US); Andrea L. Hansen, Woodbury, MN (US); Stacy M. Ulrich, Dresser, WI (US)

(73) Assignee: Carestream Health, Inc., Rochester, NY (US)

( * ) Notice: Subject to any disclaimer, the term of this patent is extended or adjusted under 35 U.S.C. 154(b) by 0 days.

(21) Appl. No.: 11/351,593

(22) Filed: Feb. 10, 2006

(51) Int. Cl.
  *G03C 5/16* (2006.01)
  *G03C 1/498* (2006.01)
(52) U.S. Cl. .................. 430/350; 430/264; 430/531; 430/598; 430/619
(58) Field of Classification Search ................ 430/619, 430/531, 350, 640, 264, 598
  See application file for complete search history.

(56) References Cited

U.S. PATENT DOCUMENTS

| 3,933,507 A | 1/1976 | von Konig et al. |
| 4,030,931 A | 6/1977 | Noguchi et al. |
| 4,211,839 A | 7/1980 | Suzuki et al. |
| 4,258,129 A | 3/1981 | Ikenoue et al. |
| 4,273,844 A | 6/1981 | Kobayashi et al. |
| 4,281,060 A | 7/1981 | Usami et al. |
| 4,332,889 A * | 6/1982 | Siga et al. .................. 430/583 |
| 4,395,484 A | 7/1983 | McCarney |
| 4,548,976 A | 10/1985 | DeRoche et al. |
| 5,369,000 A | 11/1994 | Sakizadeh et al. |
| 5,393,654 A | 2/1995 | Burrows et al. |
| 5,496,695 A | 3/1996 | Simpson et al. |
| 5,968,725 A | 10/1999 | Katoh et al. |
| 6,090,538 A | 7/2000 | Arai et al. |
| 6,376,166 B1 | 4/2002 | Oya et al. |
| 6,395,466 B1 | 5/2002 | Katoh et al. |
| 6,413,705 B1 | 7/2002 | Fujikura et al. |
| 6,413,712 B1 | 7/2002 | Yoshioka et al. |
| 6,485,989 B1 | 11/2002 | Signorini |
| 6,645,714 B2 | 11/2003 | Oya et al. |
| 6,699,649 B2 | 3/2004 | Nashijima et al. |
| 6,800,430 B2 | 10/2004 | Kyota et al. |
| 2003/0143500 A1 | 7/2003 | Oyamada et al. |
| 2003/0194658 A1 | 10/2003 | Nashijima et al. |
| 2003/0203323 A1 | 10/2003 | Takiguchi et al. |
| 2004/0043338 A1 | 3/2004 | Yanagisawa |
| 2004/0063050 A1 | 4/2004 | Nakamura et al. |
| 2004/0101794 A1 | 5/2004 | Usagawa et al. |
| 2004/0106074 A1 | 6/2004 | Kashiwagi et al. |
| 2004/0115569 A1 | 6/2004 | Kashiwagi et al. |
| 2004/0152023 A1 | 8/2004 | Okutsu et al. |
| 2004/0202970 A1 | 10/2004 | Sakai et al. |
| 2004/0224266 A1 | 11/2004 | Fukusaka et al. |
| 2005/0032010 A1 | 2/2005 | Morita |
| 2005/0221237 A1 | 10/2005 | Sakai et al. |

FOREIGN PATENT DOCUMENTS

| JP | 2003-215748 | 7/2003 |
| JP | 2003-262935 | 9/2003 |
| JP | 2004-37819 | 2/2004 |
| JP | 2005-3841 | 1/2005 |

OTHER PUBLICATIONS

STIC Search Report, Access DB#210324, Dec. 15, 2006.*
Yasuhiro Yoshioka et al, "Development of Rapid Dry Photothermographic Materials with Water-base Emulsion Coating Method", *2004 International Symposium on Silver Halide Technology*, pp. 28-31.

* cited by examiner

*Primary Examiner*—Thorl Chea

(57) ABSTRACT

Bis phenol reducing agents incorporating bicyclic and tricyclic substituents ortho to the hydroxyl groups on the aromatic rings have been found to provide photothermographic materials with improved silver efficiency and stability without significant loss in sensitometric properties.

22 Claims, No Drawings

PHOTOTHERMOGRAPHIC REDUCING AGENTS WITH BICYCLIC OR TRICYCLIC SUBSTITUTION

FIELD OF THE INVENTION

This invention relates to photothermographic materials incorporating reducing agents having specific bicyclic or tricyclic substituents. This invention also relates to methods of using these photothermographic materials.

BACKGROUND OF THE INVENTION

Silver-containing photothermographic imaging materials (that is, photosensitive thermally developable imaging materials) that are imaged with actinic radiation and then developed using heat and without liquid processing, have been known in the art for many years. Such materials are used in a recording process wherein an image is formed by imagewise exposure of the photothermographic material to specific electromagnetic radiation (for example, X-radiation, or ultraviolet, visible, or infrared radiation) and developed by the use of thermal energy. These materials, also known as "dry silver" materials, generally comprise a support having coated thereon: (a) a photocatalyst (that is, a photosensitive compound such as silver halide) that upon such exposure provides a latent image in exposed grains that are capable of acting as a catalyst for the subsequent formation of a silver image in a development step, (b) a relatively or completely non-photosensitive source of reducible silver ions, (c) a reducing composition (that is, a reducing agent) for the reducible silver ions, and (d) a binder. The latent image is then developed by application of thermal energy.

In photothermographic materials, exposure of the photographic silver halide to light produces small clusters containing silver atoms $(Ag^0)_n$. The imagewise distribution of these clusters, known in the art as a latent image, is generally not visible by ordinary means. Thus, the photosensitive material must be further developed to produce a visible image. This is accomplished by the reduction of silver ions that are in catalytic proximity to silver halide grains bearing the silver-containing clusters of the latent image. This produces a black- and-white image. The non-photosensitive silver source is catalytically reduced to form the visible black-and-white negative image while much of the silver halide, generally, remains as silver halide and is not reduced.

In photothermographic materials, the reducing agent for the reducible silver ions, often referred to as a "developer", may be any compound that, in the presence of the latent image, can reduce silver ion to metallic silver and is preferably of relatively low activity until it is heated to a temperature sufficient to cause the reaction. A wide variety of classes of compounds have been disclosed in the literature that function as reducing agents for photothermographic materials. Upon heating, and at elevated temperatures, the reducible silver ions are reduced by the reducing agent. This reaction occurs preferentially in the regions surrounding the latent image. This reaction produces a negative image of metallic silver having a color that ranges from yellow to deep black depending upon the presence of toning agents and other components in the photothermographic imaging layer(s).

Differences Between Photothermography and Photography

The imaging arts have long recognized that the field of photothermography is clearly distinct from that of photography. Photothermographic materials differ significantly from conventional silver halide photographic materials that require processing with aqueous processing solutions.

In photothermographic imaging materials, a visible image is created in the absence of a processing solvent by heat as a result of the reaction of a reducing agent incorporated within the material. Heating at 50° C. or more is essential for this dry development. In contrast, conventional photographic imaging materials require processing in aqueous processing baths at more moderate temperatures (from 30° C. to 50° C.) to provide a visible image.

In photothermographic materials, only a small amount of silver halide is used to capture light and a non-photosensitive source of reducible silver ions (for example, a silver carboxylate or a silver benzotriazole) is used to generate the visible image using thermal development. Thus, the imaged photosensitive silver halide serves as a catalyst for the physical development process involving the non-photosensitive source of reducible silver ions and the incorporated reducing agent. In contrast, conventional wet-processed, black-and-white photographic materials use only one form of silver (that is, silver halide) that, upon chemical development, is itself at least partially converted into the silver image, or that upon physical development requires addition of an external silver source (or other reducible metal ions that form black images upon reduction to the corresponding metal). Thus, photothermographic materials require an amount of silver halide per unit area that is only a fraction of that used in conventional wet-processed photographic materials.

In photothermographic materials, all of the "chemistry" for imaging is incorporated within the material itself. For example, such materials include a reducing agent (that is, a developer for the reducible silver ions) while conventional photographic materials usually do not. The incorporation of the reducing agent into photothermographic materials can lead to increased formation of various types of "fog" or other undesirable sensitometric side effects. Therefore, much effort has gone into the preparation and manufacture of photothermographic materials to minimize these problems.

Moreover, in photothermographic materials, the unexposed silver halide generally remains intact after development and the material must be stabilized against further imaging and development. In contrast, silver halide is removed from conventional photographic materials after solution development to prevent further imaging (that is, in the aqueous fixing step).

Because photothermographic materials require dry thermal processing, they present distinctly different problems and require different materials in manufacture and use, compared to conventional, wet-processed silver halide photographic materials. Additives that have one effect in conventional silver halide photographic materials may behave quite differently when incorporated in photothermographic materials where the underlying chemistry is significantly more complex. The incorporation of such additives as, for example, stabilizers, antifoggants, speed enhancers, supersensitizers, and spectral and chemical sensitizers in conventional photographic materials is not predictive of whether such additives will prove beneficial or detrimental in photothermographic materials. For example, it is not uncommon for a photographic antifoggant useful in conventional photographic materials to cause various types of fog when incorporated into photothermographic materials, or for supersensitizers that are effective in photographic materials to be inactive in photothermographic materials.

These and other distinctions between photothermographic and photographic materials are described in Unconventional Imaging Processes, E. Brinckman et al. (Eds.), The Focal Press, London and New York, 1978, pp. 74-75, in D. H. Klosterboer, *Imaging Processes and Materials*, (Neblette's Eighth Edition), J. Sturge, V. Walworth, and A. Shepp, Eds., Van Nostrand-Reinhold, New York, 1989, Chapter 9, pp. 279-291, in Zou et al., *J. Imaging Sci. Technol.* 1996, 40, pp. 94-103, and in M. R. V. Sahyun, *J. Imaging Sci. Technol.* 1998, 42, 23.

Problem to be Solved

Photothermographic materials are commercially available for use in the medical imaging industry, and are particularly used for diagnosis and archival of clinical images. These materials are currently most widely used in regions of the world where viewing and storage of imaged films is done in a controlled environment and at moderate temperature and humidity. However, photothermographic materials are now also being used in regions where the environment for viewing and storage of imaged films is less controlled and the imaged films may be stored at higher temperatures and humidity.

One common problem that exists with photothermographic systems is the stability of the image following development. Photothermographic materials are exposed with radiation and then developed with heat. If the material is subjected to additional heat after an image has been formed, such as storage in a hot environment, the additional heat over time can cause continued development. This can result in an increase in $D_{min}$, a change in color in the developed areas from black to bronze, and/or an increase in density in the imaged areas. These changes are collectively known as "hot-dark print stability" "post-processing stability" or "post-processing fog".

Another common problem that exists with photothermographic systems is the instability of the image following development when exposed to further illumination at elevated temperature. If the material is subjected to additional light and heat after an image has been formed, these conditions over time can also cause continued development. This can result in an increase in $D_{min}$. This change is known has "hot-light $D_{min}$ stability".

A further need is to provide improved photothermographic materials that use lower amounts of silver to provide the same optical density. This improvement in "silver efficiency" can result in lower cost materials.

Considerable research has been conducted to solve various problems in photothermographic materials and images with improved reducing agents or combinations thereof. For example, U.S. Pat. Nos. 6,413,712 (Yoshioka et al.) and 6,645,714 (Oya et al.) describe reducing agent compositions for such media. Hindered bis-phenol reducing agents having non-aromatic cyclic groups attached to the linking methylene group are described for example, in U.S. Pat. No. 6,699,649 (Nishijima et al.). Hindered bis-phenols having secondary or tertiary substituents on the phenol rings are described for example, in U.S. Pat. No. 6,485,898 (Yoshioka et al.). Hindered bis-phenols having cycloaliphatic or alkylene groups attached to the linking methylene group as described for example in U.S. Patent Application Publication 2005/0221237 (Sakai et al.).

There is a continuing need for photothermographic materials that provide images having improved silver efficiency, hot-dark print stability, and hot-light $D_{min}$ stability without significant loss in other desired sensitometric properties.

SUMMARY OF THE INVENTION

The present invention provides a photothermographic material comprising a support and having on at least one side thereof a photothermographic layer comprising, in reactive association:
a. a photosensitive silver halide
b. a non-photosensitive source of reducible silver ions,
c. a polymeric binder, and
d. one or more ortho-substituted bis-phenol reducing agents for the reducible silver ions, each of the reducing agents having a bicyclic or tricyclic substituent ortho to one or both hydroxyl groups on the aromatic rings.

In preferred embodiments, a black-and-white photothermographic material comprises a support and having on at least one side thereof a photothermographic layer comprising, in reactive association:
a. a photosensitive silver halide,
b. a non-photosensitive source of reducible silver ions, comprising at least silver behenate,
c. a polyvinyl butyral or polyvinyl acetal binder, and
d. a reducing agent composition comprising one or more reducing agents for the reducible silver ions represented by Structure (II)

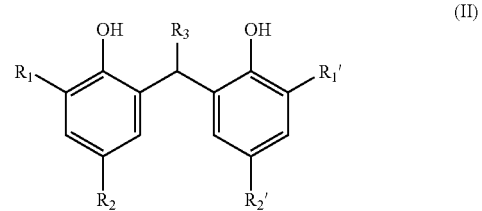

wherein $R_1$ and $R_1'$ are each a substituted or unsubstituted bicyclic or tricyclic ring group, $R_2$ and $R_2'$ are each hydrogen, or an alkyl group having from 1 to 6 carbon atoms, and $R_3$ is hydrogen or an alkyl group having from 1 to 12 carbon atoms, the material optionally further comprising a protective overcoat disposed over the photothermographic layer.

This invention also provides a method of forming a visible image comprising:
A) imagewise exposing the photothermographic material of this invention to electromagnetic radiation to form a latent image, and
B) simultaneously or sequentially, heating the exposed photothermographic material to develop the latent image into a visible image.

We have found that the use of certain bis-phenol reducing agents incorporating bicyclic and tricyclic substituents ortho to the hydroxyl group on the aromatic ring provides photothermographic materials with improved silver efficiency, hot-dark print stability, and hot-light $D_{min}$ stability without loss in other sensitometric properties.

DETAILED DESCRIPTION OF THE INVENTION

The photothermographic materials described herein can be used in black-and-white or color photothermography. They can be used in microfilm applications, in radiographic imaging (for example digital medical imaging), X-ray radiography, and in industrial radiography. Furthermore, the absorbance of these photothermographic materials between 350 and 450 nm is desirably low (less than 0.5), to permit their use in the graphic arts area (for example, image-setting and phototypesetting), in the manufacture of printing plates, in contact printing, in duplicating ("duping"), and in proofing.

The photothermographic materials are particularly useful for providing black-and-white images of human or animal subjects in response to visible, X-radiation, or infrared radiation for use in a medical diagnosis. Such applications include, but are not limited to, thoracic imaging, mammography, dental imaging, orthopedic imaging, general medical radiography, therapeutic radiography, veterinary radiography, and autoradiography. When used with X-radiation, the photothermographic materials may be used in combination with one or more phosphor intensifying screens, with phosphors incorporated within the photothermographic emulsion, or with combinations thereof. Such materials are particularly useful for dental radiography when they are directly imaged by X-radiation. The materials are also useful for non-medical uses of X-radiation such as X-ray lithography and industrial radiography.

The photothermographic materials can be made sensitive to radiation of any suitable wavelength. Thus, in some embodiments, the materials are sensitive at ultraviolet, visible, infrared, or near infrared wavelengths, of the electromagnetic spectrum. In preferred embodiments, the materials are sensitive to radiation greater than 600 nm (and preferably sensitive to infrared radiation from about 700 up to about 950 nm). Increased sensitivity to a particular region of the spectrum is imparted through the use of various spectral sensitizing dyes.

In the photothermographic materials, the components needed for imaging can be in one or more photothermographic imaging layers on one side ("frontside") of the support. The layer(s) that contain the photosensitive photocatalyst (such as a photosensitive silver halide) or non-photosensitive source of reducible silver ions, or both, are referred to herein as photothermographic emulsion layer(s). The photocatalyst and the non-photosensitive source of reducible silver ions are in catalytic proximity and preferably are in the same emulsion layer.

Where the photothermographic materials contain imaging layers on one side of the support only, various non-imaging layers are usually disposed on the "backside" (non-emulsion or non-imaging side) of the materials, including antistatic layers, conductive/antistatic layers, antihalation layers, protective layers, and transport enabling layers.

Various non-imaging layers can also be disposed on the "frontside" or imaging or emulsion side of the support, including protective topcoat layers, primer layers, interlayers, opacifying layers, conductive/antistatic layers, antihalation layers, acutance layers, auxiliary layers, and other layers readily apparent to one skilled in the art.

For some embodiments, it may be useful that the photothermographic materials be "double-sided" or "duplitized" and have the same or different photothermographic coatings (or imaging layers) on both sides of the support. In such constructions each side can also include one or more protective topcoat layers, primer layers, interlayers, acutance layers, conductive/antistatic layers auxiliary layers, anti-crossover layers, and other layers readily apparent to one skilled in the art, as well as the required conductive layer(s).

When the photothermographic materials are heat-developed as described below in a substantially water-free condition after, or simultaneously with, imagewise exposure, a silver image (preferably a black-and-white silver image) is obtained.

Definitions

As used herein:

In the descriptions of the photothermographic materials, "a" or "an" component refers to "at least one" of that component (for example, the reducing agents having bicyclic or tricyclic substituents described herein).

Unless otherwise indicated, when the term "photothermographic materials" is used herein, the term refers to materials of the present invention.

Heating in a substantially water-free condition as used herein, means heating at a temperature of from about 50° C. to about 250° C. with little more than ambient water vapor present. The term "substantially water-free condition" means that the reaction system is approximately in equilibrium with water in the air and water or any other solvent for inducing or promoting the reaction is not particularly or positively supplied from the exterior to the material. Such a condition is described in T. H. James, *The Theory of the Photographic Process*, Fourth Edition, Eastman Kodak Company, Rochester, N.Y., 1977, p. 374.

"Photothermographic material(s)" means a dry processable integral element comprising a support and at least one photothermographic emulsion layer or a set of photothermographic emulsion layers, wherein the photosensitive silver halide and the source of reducible silver ions are in one layer and the other necessary components or additives are distributed, as desired, in the same layer or in an adjacent coated layer. In the case of black-and-white photothermographic materials, a black-and-white silver image is produced. These materials also include multilayer constructions in which one or more imaging components are in different layers, but are in "reactive association". For example, one layer can include the non-photosensitive source of reducible silver ions and another layer can include the reducing agents described herein, but the two reactive components are in reactive association with each other. By "integral", we mean that all imaging chemistry required for imaging is in the material without diffusion of imaging chemistry or reaction products (such as a dye) from or to another element (such as a receiver element).

When used in photothermography, the term, "imagewise exposing" or "imagewise exposure" means that the material is imaged as a dry processable material using any exposure means that provides a latent image using electromagnetic radiation. This includes, for example, by analog exposure where an image is formed by projection onto the photosensitive material as well as by digital exposure where the image is formed one pixel at a time such as by modulation of scanning laser radiation.

"Catalytic proximity" or "reactive association" means that the reactive components are in the same layer or in adjacent layers so that they readily come into contact with each other during imaging and thermal development.

The term "emulsion layer", "imaging layer", "photothermographic layer", or "photothermographic emulsion layer" means a layer of a photothermographic material that contains the photosensitive silver halide and/or non-photosensitive source of reducible silver ions, or the reducing agents described herein. Such layers can also contain additional components or desirable additives (such as additional reducing agents). These layers are usually on what is known as the "frontside" of the support, but they can also be on both sides of the support.

"Photocatalyst" means a photosensitive compound such as silver halide that, upon exposure to radiation, provides a compound that is capable of acting as a catalyst for the subsequent development of the image-forming material.

"Simultaneous coating" or "wet-on-wet" coating means that when multiple layers are coated, subsequent layers are coated onto the initially coated layer before the initially coated layer is dry. Simultaneous coating can be used to apply layers on the frontside, backside, or both sides of the support.

"Transparent" means capable of transmitting visible light or imaging radiation without appreciable scattering or absorption.

The phrases "silver salt" and "organic silver salt" refer to an organic molecule having a bond to a silver atom. Although the compounds so formed are technically silver coordination complexes or silver compounds they are also often referred to as silver salts.

The phrase "aryl group" refers to an organic group derived from an aromatic hydrocarbon by removal of one atom, such as a phenyl group formed by removal of one hydrogen atom from benzene.

The term "buried layer" means that there is at least one other layer disposed over the layer (such as a "buried" backside conductive layer).

The terms "coating weight", "coat weight", and "coverage" are synonymous, and are usually expressed in weight or moles per unit area such as $g/m^2$ or $mol/m^2$.

"Ultraviolet region of the spectrum" refers to that region of the spectrum less than or equal to 410 nm (preferably from about 100 nm to about 410 nm) although parts of these ranges may be visible to the naked human eye.

"Visible region of the spectrum" refers to that region of the spectrum of from about 400 nm to about 700 nm.

"Short wavelength visible region of the spectrum" refers to that region of the spectrum of from about 400 nm to about 450 nm.

"Red region of the spectrum" refers to that region of the spectrum of from about 600 nm to about 700 nm.

"Infrared region of the spectrum" refers to that region of the spectrum of from about 700 nm to about 1400 nm.

"Non-photosensitive" means not intentionally light sensitive.

The sensitometric terms "photospeed", "speed", or "photographic speed" (also known as sensitivity), absorbance, and contrast have conventional definitions known in the imaging arts. The sensitometric term absorbance is another term for optical density (OD).

Speed-2 is Log1/E+4 corresponding to the density value of 1.0 above $D_{min}$ where E is the exposure in $ergs/cm^2$.

Relative Speed-2 was determined at a density value of 1.00 above $D_{min}$ and was normalized against a sample that contained no tetrafluoroborate salt and was assigned a relative speed value of 100.

Silver Efficiency is defined as $D_{max}$ divided by the silver coating weight. It is a measure of the amount of silver that has developed under a given set of exposure and development conditions.

In photothermographic materials, the term $D_{min}$ (lower case) is considered herein as image density achieved when the photothermographic material is thermally developed without prior exposure to radiation. The term $D_{max}$ (lower case) is the maximum image density achieved in the imaged area of a particular sample after imaging and development.

The term D$_{MIN}$ (upper case) is the density of the nonimaged, undeveloped material. The term D$_{MAX}$ (upper case) is the maximum image density achievable when the photothermographic material is exposed and then thermally developed. D$_{MAX}$ is also known as "Saturation Density".

As is well understood in this art, for the chemical compounds herein described, substitution is not only tolerated, but is often advisable and various substituents are anticipated on the compounds used in the present invention unless otherwise stated. Thus, when a compound is referred to as "having the structure" of a given formula or being a "derivative" of a compound, any substitution that does not alter the bond structure of the formula or the shown atoms within that structure is included within the formula, unless such substitution is specifically excluded by language.

As a means of simplifying the discussion and recitation of certain substituent groups, the term "group" refers to chemical species that may be substituted as well as those that are not so substituted. Thus, the term "alkyl group" is intended to include not only pure hydrocarbon alkyl chains, such as methyl, ethyl, n-propyl, t-butyl, cyclohexyl, iso-octyl, and octadecyl, but also alkyl chains bearing substituents known in the art, such as hydroxyl, alkoxy, phenyl, halogen atoms (F, Cl, Br, and I), cyano, nitro, amino, and carboxy. For example, alkyl group includes ether and thioether groups (for example $CH_3$—$CH_2$—$CH_2$—O—$CH_2$— and $CH_3$—$CH_2$—$CH_2$—S—$CH_2$—), haloalkyl, nitroalkyl, alkylcarboxy, carboxyalkyl, carboxamido, hydroxyalkyl, sulfoalkyl, and other groups readily apparent to one skilled in the art. Substituents that adversely react with other active ingredients, such as very strongly electrophilic or oxidizing substituents, would, of course, be excluded by the skilled artisan as not being inert or harmless.

*Research Disclosure* (http://www.researchdisclosure.com) is a publication of Kenneth Mason Publications Ltd., The Book Barn, Westbourne, Hampshire PO10 8RS, UK. It is also available from Emsworth Design Inc., 200 Park Avenue South, Room 1101, New York, N.Y. 10003.

Other aspects, advantages, and benefits of the present invention are apparent from the detailed description, examples, and claims provided in this application.

The Photocatalyst

As noted above, photothermographic materials include one or more photocatalysts in the photothermographic emulsion layer(s). Useful photocatalysts are typically photosensitive silver halides such as silver bromide, silver iodide, silver chloride, silver bromoiodide, silver chlorobromoiodide, silver chlorobromide, and others readily apparent to one skilled in the art. Mixtures of silver halides can also be used in any suitable proportion. Silver bromide and silver iodide are preferred. More preferred is silver bromoiodide in which any suitable amount of iodide is present up to almost 100% silver iodide and more likely up to about 40 mol % silver iodide. Even more preferably, the silver bromoiodide comprises at least 70 mole % (preferably at least 85 mole % and more preferably at least 90 mole %) bromide (based on total silver halide). The remainder of the halide is iodide, chloride, or chloride and iodide. Preferably the additional halide is iodide. Silver bromide and silver bromoiodide are most preferred, with the latter silver halide generally having up to 10 mole % silver iodide.

In some embodiments of aqueous-based photothermographic materials, higher amounts of iodide may be present in homogeneous photosensitive silver halide grains, and particularly from about 20 mol % up to the saturation limit of iodide as described, for example, U.S. Patent Application Publication 2004/0053173 (Maskasky et al.).

The silver halide grains may have any crystalline habit or morphology including, but not limited to, cubic, octahedral, tetrahedral, orthorhombic, rhombic, dodecahedral, other polyhedral, tabular, laminar, twinned, or platelet morphologies and may have epitaxial growth of crystals thereon. If desired, a mixture of grains with different morphologies can be employed. Silver halide grains having cubic and tabular morphology (or both) are preferred.

The silver halide grains may have a uniform ratio of halide throughout. They may also have a graded halide content, with a continuously varying ratio of, for example, silver bromide and silver iodide or they may be of the core-shell type, having a discrete core of one or more silver halides, and a discrete shell of one or more different silver halides. Core-shell silver halide grains useful in photothermographic materials and methods of preparing these materials are described in U.S. Pat. No. 5,382,504 (Shor et al.), incorporated herein by reference. Iridium and/or copper doped core-shell and non-core-shell grains are described in U.S. Pat. Nos. 5,434,043 (Zou et al.) and 5,939,249 (Zou), both incorporated herein by reference.

In some instances, it may be helpful to prepare the photosensitive silver halide grains in the presence of a hydroxytetrazaindene (such as 4-hydroxy-6-methyl-1,3,3a,7-tetrazaindene) or an N-heterocyclic compound comprising at least one mercapto group (such as 1-phenyl-5-mercaptotetrazole) as described in U.S. Pat. No. 6,413,710 (Shor et al.) that is incorporated herein by reference.

The photosensitive silver halide can be added to (or formed within) the emulsion layer(s) in any fashion as long as it is placed in catalytic proximity to the non-photosensitive source of reducible silver ions.

It is preferred that the silver halides be preformed and prepared by an ex-situ process. With this technique, one has the possibility of more precisely controlling the grain size, grain size distribution, dopant levels, and composition of the silver halide, so that one can impart more specific properties to both the silver halide grains and the resulting photothermographic material.

In some constructions, it is preferable to form the non-photosensitive source of reducible silver ions in the presence of ex-situ-prepared silver halide. In this process, the source of reducible silver ions, such as a long chain fatty acid silver carboxylate (commonly referred to as a silver "soap" or homogenate), is formed in the presence of the preformed silver halide grains. Co-precipitation of the source of reducible silver ions in the presence of silver halide provides a more intimate mixture of the two materials to provide a material often referred to as a "preformed soap" [see U.S. Pat. No. 3,839,049 (Simons)].

In some constructions, it is preferred that preformed silver halide grains be added to and "physically mixed" with the non-photosensitive source of reducible silver ions.

Preformed silver halide emulsions can be prepared by aqueous or organic processes and can be unwashed or washed to remove soluble salts. Soluble salts can be removed by any desired procedure for example as described in U.S. Pat. Nos. 2,489,341 (Waller et al.), 2,565,418 (Yackel), 2,614,928 (Yutzy et al.), 2,618,556 (Hewitson et al.), and 3,241,969 (Hart et al.).

It is also effective to use an in-situ process in which a halide- or a halogen-containing compound is added to an organic silver salt to partially convert the silver of the organic silver salt to silver halide. Inorganic halides (such as zinc bromide, zinc iodide, calcium bromide, lithium bromide, lithium iodide, or mixtures thereof) or an organic halogen-containing compound (such as N-bromo-succinimide or pyridinium hydrobromide perbromide) can be used. The details of such in-situ generation of silver halide are well known and described in U.S. Pat. No. 3,457,075 (Morgan et al.).

It is particularly effective to use a mixture of both preformed and in-situ generated silver halide. The preformed silver halide is preferably present in a preformed soap.

Additional methods of preparing silver halides and organic silver salts and blending them are described in *Research Disclosure*, June 1978, item 17029, U.S. Pat. Nos. 3,700,458 (Lindholm) and 4,076,539 (Ikenoue et al.), and Japanese Kokai 49-013224 (Fuji), 50-017216 (Fuji), and 51-042529 (Fuji).

The silver halide grains used in the imaging formulations can vary in average diameter of up to several micrometers (μm) depending on the desired use. Preferred silver halide grains for use in preformed emulsions containing silver carboxylates are cubic grains having a number average particle size of from about 0.01 to about 1.0 μm, more preferred are those having a number average particle size of from about 0.03 to about 0.1 nm. It is even more preferred that the grains have a number average particle size of 0.06 μm or less, and most preferred that they have a number average particle size of from about 0.03 to about 0.06 μm. Mixtures of grains of various average particle size can also be used. Preferred silver halide grains for high-speed photothermographic constructions use are tabular grains having an average thickness of at least 0.02 μm and up to and including 0.10 μm, an equivalent circular diameter of at least 0.5 μm and up to and including 8 μm and an aspect ratio of at least 5:1. More preferred are those having an average thickness of at least 0.03 μm and up to and including 0.08 μm, an equivalent circular diameter of at least 0.75 μm and up to and including 6 μm and an aspect ratio of at least 10:1.

The average size of the photosensitive silver halide grains is expressed by the average diameter if the grains are spherical, and by the average of the diameters of equivalent circles for the projected images if the grains are cubic or in other non-spherical shapes. Representative grain sizing methods are described in *Particle Size Analysis*, ASTM Symposium on Light Microscopy, R. P. Loveland, 1955, pp. 94-122, and in C. E. K. Mees and T. H. James, *The Theory of the Photographic Process*, Third Edition, Macmillan, New York, 1966, Chapter 2. Particle size measurements may be expressed in terms of the projected areas of grains or approximations of their diameters. These will provide reasonably accurate results if the grains of interest are substantially uniform in shape.

The one or more light-sensitive silver halides are preferably present in an amount of from about 0.005 to about 0.5 mole, more preferably from about 0.01 to about 0.25 mole, and most preferably from about 0.03 to about 0.15 mole, per mole of non-photosensitive source of reducible silver ions.

Chemical Sensitization

The photosensitive silver halides can be chemically sensitized using any useful compound that contains sulfur, tellurium, or selenium, or may comprise a compound containing gold, platinum, palladium, ruthenium, rhodium, iridium, or combinations thereof, a reducing agent such as a tin halide or a combination of any of these. The details of these materials are provided for example, in T. H. James, *The Theory of the Photographic Process*, Fourth Edition, Eastman Kodak Company, Rochester, N.Y., 1977, Chapter 5, pp. 149-169. Suitable conventional chemical sensitization procedures are also described in U.S. Pat. No. 1,623,499 (Sheppard et al.), U.S. Pat. Nos. 2,399,083 (Waller et al.), 3,297,447 (McVeigh), 3,297,446 (Dunn), 5,049,485 (Deaton), 5,252,455 (Deaton), 5,391,727 (Deaton), 5,912, 111 (Lok et al.), and 5,759,761 (Lushington et al.), and EP 0 915 371A1 (Lok et al.), all of which are incorporated herein by reference.

Mercaptotetrazoles and tetraazindenes as described in U.S. Pat. No. 5,691,127 (Daubendiek et al.), incorporated herein by reference, can also be used as suitable addenda for tabular silver halide grains.

Certain substituted and unsubstituted thiourea compounds can be used as chemical sensitizers including those described in U.S. Pat. No. 6,368,779 (Lynch et al.) that is incorporated herein by reference.

Still other additional chemical sensitizers include certain tellurium-containing compounds that are described in U.S. Pat. No. 6,699,647 (Lynch et al.), and certain selenium-containing compounds that are described in U.S. Pat. No. 6,620,577 (Lynch et al.), that are both incorporated herein by reference.

Combinations of gold(III)-containing compounds and either sulfur-, tellurium-, or selenium-containing compounds are also useful as chemical sensitizers as described in U.S. Pat. No. 6,423,481 (Simpson et al.) that is also incorporated herein by reference.

In addition, sulfur-containing compounds can be decomposed on silver halide grains in an oxidizing environment according to the teaching in U.S. Pat. No. 5,891,615 (Winslow et al.). Examples of sulfur-containing compounds that can be used in this fashion include sulfur-containing spectral sensitizing dyes. Other useful sulfur-containing chemical sensitizing compounds that can be decomposed in an oxidizing environment are the diphenylphosphine sulfide compounds described in copending and commonly assigned U.S. Patent Application Publications 2005/0123870 (Simpson et al.), 2005/0123871 (Burleva et al.), and 2005/123872 (Burleva et al.). The above patent and patent application publications are incorporated herein by reference.

The chemical sensitizers can be present in conventional amounts that generally depend upon the average size of the silver halide grains. Generally, the total amount is at least $10^{-10}$ mole per mole of total silver, and preferably from about $10^{-8}$ to about $10^{-2}$ mole per mole of total silver for silver halide grains having an average size of from about 0.01 to about 1 μm.

Spectral Sensitization

The photosensitive silver halides may be spectrally sensitized with one or more spectral sensitizing dyes that are known to enhance silver halide sensitivity to ultraviolet, visible, and/or infrared radiation (that is, sensitivity within the range of from about 300 to about 1400 nm). It is preferred that the photosensitive silver halide be sensitized to infrared radiation (that is from about 700 to about 950 nm). Non-limiting examples of spectral sensitizing dyes that can be employed include cyanine dyes, merocyanine dyes, complex cyanine dyes, complex merocyanine dyes, holopolar cyanine dyes, hemicyanine dyes, styryl dyes, and hemioxanol dyes. They may be added at any stage in the preparation of the photothermographic emulsion, but are generally added after chemical sensitization is achieved.

Suitable spectral sensitizing dyes such as those described in U.S. Pat. Nos. 3,719,495 (Lea), 4,396,712 (Kinoshita et al.), 4,439,520 (Kofron et al.), 4,690,883 (Kubodera et al.), 4,840,882 (Iwagaki et al.), 5,064,753 (Kohno et al.), 5,281,515 (Delprato et al.), 5,393,654 (Burrows et al.), 5,441,866 (Miller et al.), 5,508,162 (Dankosh), 5,510,236 (Dankosh), and 5,541,054 (Miller et al.), Japanese Kokai 2000-063690 (Tanaka et al.), 2000-112054 (Fukusaka et al.), 2000-273329 (Tanaka et al.), 2001-005145 (Arai), 2001-064527 (Oshiyama et al.), and 2001-154305 (Kita et al.) can be used. Useful spectral sensitizing dyes are also described in *Research Disclosure*, December 1989, item 308119, Section IV and *Research Disclosure*, 1994, item 36544, section V. All of the publications noted above are incorporated herein by reference.

Teachings relating to specific combinations of spectral sensitizing dyes also include U.S. Pat. Nos. 4,581,329 (Sugimoto et al.), 4,582,786 (Ikeda et al.), 4,609,621 (Sugimoto et al.), 4,675,279 (Shuto et al.), 4,678,741 (Yamada et al.), 4,720,451 (Shuto et al.), 4,818,675 (Miyasaka et al.), 4,945,036 (Arai et al.), and 4,952,491 (Nishikawa et al.). All of the above publications and patents are incorporated herein by reference.

Also useful are spectral sensitizing dyes that decolorize by the action of light or heat as described in U.S. Pat. No. 4,524,128 (Edwards et al.) and Japanese Kokai 2001-109101 (Adachi), 2001-154305 (Kita et al.), and 2001-183770 (Hanyu et al.), all incorporated herein by reference.

Dyes may be selected for the purpose of supersensitization to attain much higher sensitivity than the sum of sensitivities that can be achieved by using each dye alone.

An appropriate amount of spectral sensitizing dye added is generally about $10^{-10}$ to $10^{-1}$ mole, and preferably, about $10^{-7}$ to $10^{-2}$ mole per mole of silver halide.

Non-Photosensitive Source of Reducible Silver Ions

The non-photosensitive source of reducible silver ions in the photothermographic materials is a silver-organic compound that contains reducible silver (1+) ions. Such compounds are generally silver salts of silver organic coordinating ligands that are comparatively stable to light and form a silver image when heated to 50° C. or higher in the presence of an exposed photocatalyst (such as silver halide) and a reducing agent composition.

The primary organic silver salt is often a silver salt of an aliphatic carboxylic acid (described below). Mixtures of silver salts of aliphatic carboxylic acids are particularly useful where the mixture includes at least silver behenate.

Useful silver carboxylates include silver salts of long-chain aliphatic carboxylic acids. The aliphatic carboxylic acids generally have aliphatic chains that contain 10 to 30, and preferably 15 to 28, carbon atoms. Examples of such preferred silver salts include silver behenate, silver arachidate, silver stearate, silver oleate, silver laurate, silver caprate, silver myristate, silver palmitate, silver maleate, silver fumarate, silver tartarate, silver furoate, silver linoleate, silver butyrate, silver camphorate, and mixtures thereof. Most preferably, at least silver behenate is used alone or in mixtures with other silver carboxylates.

Silver salts other than the silver carboxylates described above can be used also. Such silver salts include silver salts of aliphatic carboxylic acids containing a thioether group as described in U.S. Pat. No. 3,330,663 (Weyde et al.), soluble silver carboxylates comprising hydrocarbon chains incorporating ether or thioether linkages or sterically hindered substitution in the α-(on a hydrocarbon group) or ortho-(on an phenyl group) position as described in U.S. Pat. No. 5,491,059 (Whitcomb), silver salts of dicarboxylic acids, silver salts of sulfonates as described in U.S. Pat. No. 4,504,575 (Lee), silver salts of sulfosuccinates as described in EP 0 227 141A1 (Leenders et al.), silver salts of aryl carboxylic acids (such as silver benzoate), silver salts of acetylenes as described, for example in U.S. Pat. Nos. 4,761,361 (Ozaki et al.) and 4,775,613 (Hirai et al.), and silver salts of heterocyclic compounds containing mercapto or thione groups and derivatives as described in U.S. Pat. Nos. 4,123,274 (Knight et al.) and 3,785,830 (Sullivan et al.).

It is also convenient to use silver half soaps such as an equimolar blend of silver carboxylate and carboxylic acid that analyzes for about 14.5% by weight solids of silver in the blend and that is prepared by precipitation from an aqueous solution of an ammonium or an alkali metal salt of a commercially available fatty carboxylic acid, or by addition of the free fatty acid to the silver soap.

The methods used for making silver soap emulsions are well known in the art and are disclosed in *Research Disclosure*, April 1983, item 22812, *Research Disclosure*, October 1983, item 23419, U.S. Pat. No. 3,985,565 (Gabrielsen et al.) and the references cited above.

Sources of non-photosensitive reducible silver ions can also be core-shell silver salts as described in U.S. Pat. No. 6,355,408 (Whitcomb et al.), wherein a core has one or more silver salts and a shell has one or more different silver salts, as long as one of the silver salts is a silver carboxylate. Other useful sources of non-photosensitive reducible silver ions are the silver dimer compounds that comprise two different silver salts as described in U.S. Pat. No. 6,472,131 (Whitcomb). Still other useful sources of non-photosensitive reducible silver ions are the silver core-shell compounds comprising a primary core comprising one or more photosensitive silver halides, or one or more non-photosensitive inorganic metal salts or non-silver containing organic salts, and a shell at least partially covering the primary core, wherein the shell comprises one or more non-photosensitive silver salts, each of which silver salts comprises a organic silver coordinating ligand. Such compounds are described in U.S. Pat. No. 6,803,177 (Bokhonov et al.). All of the above patents are incorporated herein by reference.

Organic silver salts that are particularly useful in organic solvent-based photothermographic materials include silver carboxylates (both aliphatic and aryl carboxylates), silver benzotriazolates, silver sulfonates, silver sulfosuccinates, and silver acetylides. Silver salts of long-chain aliphatic carboxylic acids containing 15 to 28 carbon atoms are particularly preferred.

The one or more non-photosensitive sources of reducible silver ions are preferably present in an amount of from about 5% to about 70%, and more preferably from about 10% to about 50%, based on the total dry weight of the emulsion layers. Alternatively stated, the amount of the sources of reducible silver ions is generally from about 0.002 to about 0.2 mol/m² of the dry photothermographic material (preferably from about 0.01 to about 0.05 mol/m²).

The total amount of silver (from all silver sources) in the photothermographic materials is generally at least 0.002 mol/m², preferably from about 0.01 to about 0.05 mol/m², and more preferably from about 0.01 to about 0.02 mol/m². In other aspects, it is desirable to use total silver (from both silver halide and reducible silver salts) at a coating weight of less than 2 g/m² and preferably at less than 1.8 g/m².

Reducing Agents

The reducing agent (or reducing agent composition comprising two or more components) for the source of reducible silver ions is a compound that can reduce silver (1+) ion to metallic silver. The "reducing agent" is sometimes called a "developer" or "developing agent". When a silver carboxylate silver source is used in a photothermographic material, one or more hindered bis-phenol reducing agents have been commonly used.

We have found that the use of one or more ortho-substituted bis-phenol reducing agents, each incorporating bicyclic and tricyclic substituents ortho to the one or both hydroxyl groups on the aromatic rings provides photothermographic materials with improved silver efficiency, hot-dark print stability, and hot light $D_{min}$ stability without significant loss in other sensitometric properties.

The bicyclic and tricyclic substituents described herein can be comprised of fused rings or rings having bridging atoms connecting 2 or more non-adjacent ring atoms. Substituents having both of these moieties can be used. Bicyclic and tricyclic substituents having bridging atoms are preferred. The bicyclic and tricyclic substituents are composed of from 6 to 14 carbon atoms in the ring system and can be substituted in various positions, as one skilled in the art would be able to readily determine. Preferably, the bis-phenol compounds are substituted in each ortho position with the same substituted or unsubstituted bicyclic or tricyclic substituent.

Where the photothermographic material has the same or different photothermographic layer(s) on both sides of the support, one or more of the same or different reducing agents having bicyclic or tricyclic substituents can be present on one or both sides of the support also.

Preferably, the ortho-substituted bis-phenol reducing agents are represented by the following Structure (I)

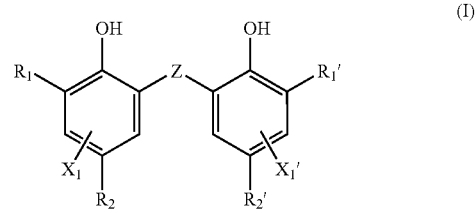

(I)

wherein $R_1$ and $R_1'$ each represent a substituted or unsubstituted bicyclic or tricyclic ring group, $R_2$ and $R_2'$ independently represent a hydrogen atom or a group that can be a substituent on a benzene ring, Z represents —S— or a —CHR₃-group wherein $R_3$ represents hydrogen, a substituted or unsubstituted linear, branched, or cyclic, bicyclic, or tricyclic alkyl, cycloalkyl, alkenyl, aralkyl, heterocyclic, aryl, or heteroaryl group, and $X_1$ and $X_1'$ independently represent a hydrogen atom or a group that can be a substituent on a benzene ring.

Preferably, $R_1$ and $R_1'$ each represent substituted or unsubstituted bicyclic or tricyclic ring group having 7 to 12 carbon atoms in the ring. More preferably, $R_1$ and $R_1'$ are the same substituted or unsubstituted bicyclic or tricyclic group. Most preferably, $R_1$ and $R_1'$ each independently represent a substituted or unsubstituted adamantyl, norbornyl, or isobornyl group.

$R_2$ and $R_2'$ independently represent a hydrogen atom or a group that can be a substituent on a benzene ring. Examples of substituents on a benzene ring include substituted or unsubstituted alkyl groups having 1 to 20 carbon atoms, substituted or unsubstituted aryl groups having 6 to 26 carbon atoms, a halogen atom, a substituted or unsubstituted alkoxy group having 1 to 20 carbon atoms, and a substituted or unsubstituted acylamino group having 2 to 21 carbon atoms. $R_2$ and $R_2'$ may also form a saturated ring together with $X_1$ and $X_1'$ respectively.

Preferably, $R_2$ and $R_2'$ independently represent an alkyl group having 1 to 6 carbon atoms (such as methyl, ethyl, propyl, butyl, iso-propyl, tert-butyl, tert-amyl, cyclohexyl, 1-methylcyclohexyl, benzyl, hydroxyethyl, hydroxymethyl, methoxymethyl, or methoxyethyl). More preferably, $R_2$ and $R_2'$ each independently represent methyl, ethyl, propyl, iso-propyl or tert-butyl group.

In Structure I, Z is —S— (thio), or a substituted or unsubstituted methylene group such as —CH($R_3$)—, wherein $R_3$ represents a hydrogen atom or a substituted or unsubstituted linear, branched, or cyclic, bicyclic, or tricyclic alkyl group having 1 to 20 carbon atoms, a substituted or unsubstituted linear, branched, or cyclic alkenyl group having from 2 to 20 carbon atoms, a substituted or unsubstituted aralkyl group having from 1 to 20 carbon atoms, a substituted or unsubstituted heterocyclic group having from 3 to 20 carbon, nitrogen, oxygen, or sulfur atoms, a substituted or unsubstituted aryl group having from 6 to 20 carbon atoms, or a substituted or unsubstituted heteroaryl group having from 5 to 20 carbon, nitrogen, oxygen, or sulfur atoms.

Preferably, Z is a —CHR$_3$— group wherein $R_3$ represents hydrogen, a substituted or unsubstituted linear, branched, or cyclic alkyl group having 1 to 20 carbon atoms, or an aralkyl group having 7 to 10 carbon atoms. More preferably, $R_3$ represents hydrogen, a linear or branched alkyl group having 1 to 12 carbon atoms (such as methyl, ethyl, propyl, iso-propyl, n-butyl, cyclohexyl, iso-butyl, tert-butyl, 1-ethylpentyl, 2,4,4-trimethylpentyl, and 3,5,5-trimethyl-hexyl), or an aralkyl group (such as benzyl or phenethyl).

$X_1$ and $X_1'$ independently represent a hydrogen atom or a group that can be a substituent on benzene ring. Examples of substituents on a benzene ring include a substituted or unsubstituted alkyl group having 1 to 20 carbon atoms, a substituted or unsubstituted aryl group having 6 to 26 carbon atoms, a halogen atom, a substituted or unsubstituted alkoxy group having 1 to 20 carbon atoms, a substituted or unsubstituted acylamino group having 2 to 21 carbon atoms. $X_1$ and $X_1'$ may also form a saturated ring together with $R_2$ or $R_2'$ respectively. Preferably, $X_1$ and $X_1'$ represent hydrogen atom, a halogen atom or an alkyl group, and more preferably both represent a hydrogen atom.

In preferred embodiments the ortho-substituted bis-phenol reducing agents for the reducible silver ions are represented by the following Structure (II)

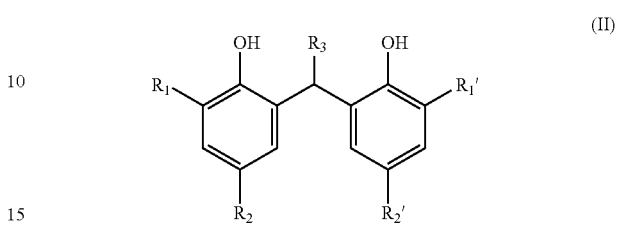

wherein $R_1$ and $R_1'$ are each a substituted or unsubstituted bicyclic or tricyclic ring group as described above, $R_2$ and $R_2'$ are each hydrogen or an alkyl group having from 1 to 6 carbon atoms as defined above, and $R_3$ is hydrogen or an alkyl group having from 1 to 12 carbon atoms as defined above.

The following compounds (o-BTBP-1) to (o-BTBP-25) in TABLE I are representative of the ortho-substituted bis-phenol reducing agents represented by Structure (I) that are useful in the present invention:

TABLE I

| Compound | $R_1$, $R_1'$ | $R_2$, $R_2'$ | Z |
|---|---|---|---|
| o-BTBP-1 | Isobornyl | Me | CH$_2$ |
| o-BTBP-2 | Isobornyl | Me | S |
| o-BTBP-3 | Isobornyl | Et | CH(CH$_2$CH$_2$Ph) |
| o-BTBP-4 | Isobornyl | Me | 7,7-dimethylbicyclo[2.2.1]hepta-2,5-dien-1-yl |
| o-BTBP-5 | Norbornyl | Me | CH$_2$ |
| o-BTBP-6 | Benzonorbornyl | Me | CH$_2$ |
| o-BTBP-7 | Adamantyl | Me | CH$_2$ |
| o-BTBP-8 | Bicyclo[2.1.1]hexyl | Me | CH$_2$ |
| o-BTBP-9 | Bicyclo[2.1.1]hexyl | Me | CH(n-Pr) |
| o-BTBP-10 | Bicyclo[2.1.1]hexyl | Me | Ph |
| o-BTBP-11 | Bicyclo[3.2.1]octyl | Et | CH$_2$ |
| o-BTBP-12 | Benzobicyclo[3.2.1]octyl | hydroxymethyl | CHMe |
| o-BTBP-13 | Benzo[3,4]bicyclo[3.2.1]oct-3-enyl | Me | S |
| o-BTBP-14 | Bicyclo[2.2.2]octyl | Me | CHBu |
| o-BTBP-15 | Bicyclo[3.2.2]nonyl | Me | CH(i-Pr) |
| o-BTBP-16 | Benzobicyclo[2.2.2]octyl | Et | S |
| o-BTBP-17 | Bicyclo[3.3.1]nonyl | 2-hydroxyethyl | CH$_2$ |
| o-BTBP-18 | Bicyclo[3.3.2]decyl | hydroxymethyl | CHMe |
| o-BTBP-19 | Bicyclo[4.3.1]decyl | iso-Propyl | CH$_2$ |
| o-BTBP-20 | Bicyclo[4.4.1]undecyl | Me | CH(cyclohexyl) |
| o-BTBP-21 | Bicyclo[5.4.1]dodecyl | Me | CH(cyclohexenyl) |
| o-BTBP-22 | Tricyclo[5.3.1.0(1,5)]undecyl | Me | CH$_2$ |
| o-BTBP-23 | Tricyclo[5.2.1.0(2,6)]decyl | Me | CH$_2$ |
| o-BTBP-24 | Tricyclo[5.3.1.0(2,9)]undecyl | Me | CH$_2$ |
| o-BTBP-25 | Norbornyl | Et | S |

In some instances, the reducing agent composition comprises two or more components such as a mixture of one or more ortho-substituted bis-phenol reducing agents incorporating bicyclic and tricyclic substituents ortho to the hydroxyl group on the aromatic ring along with one or more hindered mono-phenol reducing agents, or one or more other hindered bis-phenol reducing agents not incorporating bicyclic and tricyclic substituents ortho to the hydroxyl group on the aromatic ring, or mixtures thereof. Co-reducing agents chosen from the various classes of co-reducing agents and reducing agents described below can also be added. Reducing agent mixtures involving the further addition of contrast enhancing agents are also useful. Such contrast enhancing agents can be chosen from the various classes of reducing agents described below.

"Hindered phenol reducing agents" are compounds that contain only one hydroxy group on a given phenyl ring and have at least one additional substituent located ortho to the hydroxy group.

One type of hindered phenol reducing agents are hindered phenols and hindered naphthols. This type of hindered phenol includes, for example, 2,6-di-t-butyl-4-methylphenol, 2,6-di-t-butyl-4-benzylphenol 2-benzyl-4-methyl-6-t-butylphenol, 2,4-dimethyl-6-(1'-methylcyclohexyl)phenol, and 3,5-bis(1,1-dimethylethyl)-4-hydroxy-benzenepropanoic acid 2,2-bis [[3-[3,5-bis(1,1-dimethylethyl)-4-hydroxyphenyl]-1-oxopropoxy]methyl]-1,3-propanediyl ester (IRGANOX® 1010).

Another type of hindered phenol reducing agent are hindered bis-phenols. "Hindered bis-phenols" contain more than one hydroxy group each of which is located on a different phenyl ring. This type of hindered phenol includes, for example, binaphthols (that is dihydroxybinaphthyls), biphenols (that is dihydroxybiphenyls), bis(hydroxynaphthyl)methanes, bis(hydroxyphenyl)-methanes, bis(hydroxyphenyl)ethers, bis(hydroxyphenyl)sulfones, and bis(hydroxyphenyl)thioethers, each of which may have additional substituents. Preferred hindered bis-phenol reducing agents are bis(hydroxyphenyl)methanes.

Particularly preferred examples of such hindered bis-phenol reducing agents that can be used along with the ortho-substituted bis-phenol reducing agents having bicyclic or tricyclic groups ortho to the hydroxyl group described herein include bis(hydroxyphenyl)methanes such as, bis(2-hydroxy-3-t-butyl-5-methylphenyl)methane, 1,1'-bis(2-hydroxy-3,5-dimethylphenyl)-3,5,5-trimethylhexane, bis[2-hydroxy-3-(1-methylcyclohexyl)-5-methyl-phenyl] methane, 1,1'-bis(2-hydroxy-3,5-dimethylphenyl)isobutane, and 2,6-bis[(2-hydroxy-3,5-dimethylphenyl)methyl]-4-methylphenol. Further examples are described in U.S. Pat. Nos. 6,413,712, 6,645,714, 6,485,898, and 6,699,649, and in U.S. Patent Application Publication 2005/0221237, all noted above. All of such hindered bis-phenol compounds also have at least one substituent ortho to the hydroxyl group and are often referred to simply as hindered ortho-substituted-bis-phenols.

Additional reducing agents include the bis-phenol-phosphorous compounds described in U.S. Pat. No. 6,514,684 (Suzuki et al), the bis-phenol, aromatic carboxylic acid, hydrogen bonding compound mixture described in U.S. Pat. No. 6,787,298 (Yoshioka), and the compounds that can be one-electron oxidized to provide a one-electron oxidation product that releases one or more electrons as described in U.S. Patent Application Publication 2005/0214702 (Ohzeki). Other reducing agents that can be combined with the reducing agent having Structures (I) or (II) include substituted hydrazines including the sulfonyl hydrazides described in U.S. Pat. No. 5,464,738 (Lynch et al.). Still other useful reducing agents are described in U.S. Pat. Nos. 3,074,809 (Owen), 3,080,254 (Grant, Jr.), 3,094,417 (Workman), 3,887,417 (Klein et al.), 4,030,931 (Noguchi et al.), and 5,981,151 (Leenders et al.). All of these patents are incorporated herein by reference.

Additional reducing agents that may also be used include amidoximes, azines, a combination of aliphatic carboxylic acid aryl hydrazides and ascorbic acid, a reductone and/or a hydrazine, piperidinohexose reductone or formyl-4-methylphenylhydrazine, hydroxamic acids, a combination of azines and sulfonamidophenols, α-cyanophenylacetic acid derivatives, reductones, indane-1,3-diones, chromans, 1,4-dihydropyridines, and 3-pyrazolidones.

Useful co-developer reducing agents can also be used as described in U.S. Pat. No. 6,387,605 (Lynch et al.). Additional classes of reducing agents that can be used as co-developer reducing agents are trityl hydrazides and formyl phenyl hydrazides as described in U.S. Pat. No. 5,496,695 (Simpson et al.), 2-substituted malondialdehyde compounds as described in U.S. Pat. No. 5,654,130 (Murray), and 4-substituted isoxazole compounds as described in U.S. Pat. No. 5,705,324 (Murray). Additional reducing agents are described in U.S. Pat. No. 6,100,022 (Inoue et al.). Yet another class of co-reducing agents includes substituted acrylonitrile compounds such as the compounds identified as HET-01 and HET-02 in U.S. Pat. No. 5,635,339 (Murray) and CN-01 through CN-13 in U.S. Pat. No. 5,545,515 (Murray et al.). All of the patents above are incorporated herein by reference.

Various contrast enhancing agents can be added. Such materials are useful for preparing printing plates and duplicating films useful in graphic arts, or nucleation of medical diagnostic films. Examples of such agents are described in U.S. Pat. No. 6,150,084 (Ito et al.), U.S. Pat. No. 6,620,582 (Hirabayashi), and U.S. Pat. No. 6,764,385 (Watanabe et al.). Certain contrast enhancing agents are preferably used in some photothermographic materials with specific co-reducing agents. Examples of such useful contrast enhancing agents include, but are not limited to, hydroxylamines, alkanolamines and ammonium phthalamate compounds as described in U.S. Pat. No. 5,545,505 (Simpson), hydroxamic acid compounds as described for example, in U.S. Pat. No. 5,545,507 (Simpson et al.), N-acylhydrazine compounds as described in U.S. Pat. No. 5,558,983 (Simpson et al.), and hydrogen atom donor compounds as described in U.S. Pat. No. 5,637,449 (Harring et al.). All of the patents above are incorporated herein by reference.

The reducing agent (or mixture thereof) described herein is generally present at from about 1 to about 25% (dry weight) of the photothermographic emulsion layer in which it is located. In multilayer constructions, if the reducing agent is added to a layer other than a photothermographic emulsion layer, slightly higher proportions, of from about 2 to 35 weight % may be more desirable. Thus, the total range for the reducing agent is from about 1 to about 35% (dry weight). Also, the reducing agent (or mixture thereof) described herein containing the bicyclic or tricyclic substituents is generally present in an amount of at least 0.1 and up to and including about 0.5 mol/mol of total silver in the photothermographic material, and preferably in an amount of from about 0.1 to about 0.4 mol/mol of total silver. Co-reducing agents may be present generally in an amount of from about 0.001% to about 20% (dry weight) of the emulsion layer coating.

Other Addenda

The photothermographic materials can also contain other additives such as shelf-life stabilizers, antifoggants, contrast enhancers (described above), toners, development accelerators, acutance dyes, post-processing stabilizers or stabilizer precursors, thermal solvents (also known as melt formers), and other image-modifying agents as would be readily apparent to one skilled in the art.

Suitable stabilizers that can be used alone or in combination include thiazolium salts as described in U.S. Pat. No. 2,131,038 (Brooker) and U.S. Pat. No. 2,694,716 (Allen), azaindenes as described in U.S. Pat. No. 2,886,437 (Piper), triazaindolizines as described in U.S. Pat. No. 2,444,605

(Heimbach), the urazoles described in U.S. Pat. No. 3,287,135 (Anderson), sulfocatechols as described in U.S. Pat. No. 3,235,652 (Kennard), the oximes described in GB 623,448 (Carrol et al.), polyvalent metal salts as described in U.S. Pat. No. 2,839,405 (Jones), thiuronium salts as described in U.S. Pat. No. 3,220,839 (Herz), palladium, platinum, and gold salts as described in U.S. Pat. No. 2,566,263 (Trirelli) and U.S. Pat. No. 2,597,915 (Damshroder), and the heteroaromatic mercapto compounds or heteroaromatic disulfide compounds described in EP 0 559 228B 1 (Philip et al.), all of which are incorporated by reference.

Heteroaromatic mercapto compounds are most preferred. Examples of preferred heteroaromatic mercapto compounds are 2-mercaptobenzimidazole, 2-mercapto-5-methylbenzimidazole, 2-mercaptobenzothiazole and 2-mercaptobenzoxazole, and mixtures thereof. A heteroaromatic mercapto compound is generally present in an emulsion layer in an amount of at least 0.0001 mole (preferably from about 0.001 to about 1.0 mole) per mole of total silver in the emulsion layer.

In addition to the supersensitizers described above, large cyclic compounds featuring a heteroatom disclosed in U.S. Pat. No. 6,475,710 (Kudo et al.) may be used as a supersensitizer.

Other useful antifoggants/stabilizers are described in U.S. Pat. No. 6,083,681 (Lynch et al.). Still other antifoggants are hydrobromic acid salts of heterocyclic compounds (such as pyridinium hydrobromide perbromide) as described in U.S. Pat. No. 5,028,523 (Skoug), benzoyl acid compounds as described in U.S. Pat. No. 4,784,939 (Pham), substituted propenenitrile compounds as described in U.S. Pat. No. 5,686,228 (Murray et al.), silyl blocked compounds as described in U.S. Pat. No. 5,358,843 (Sakizadeh et al.), the 1,3-diaryl-substituted urea compounds described copending and commonly assigned U.S. Ser. No. 11/284,928 (filed Nov. 22, 2005 by Bryan V. Hunt and Kumars Sakizadeh), and tribromomethylketones as described in EP 0 600 587A1 (Oliff et al.). All of these documents are incorporated herein by reference.

Additives useful as stabilizers for improving dark stability and desktop print stability are the various boron compounds described in commonly assigned U.S. Patent Application Publication No.2006/0141404 (Philip et al.) that is incorporated herein by reference. The boron compounds are preferably added in an amount of from about 0.010 to about 0.50 g/m$^2$.

Also useful as stabilizers for improving the post-processing print stability of the imaged material to heat during storage (known as "hot-dark print stability") are the arylboronic acid compounds described in commonly assigned U.S. Ser. No. 11/351,773 (filed on even date herewith by Chen-Ho and Sakizadeh entitled "Photothermographic Materials Incorporating Arylboronic Acids", that is incorporated herein by reference.

The photothermographic materials preferably also include one or more polyhalogen stabilizers that can be represented by the formula Q—(Y)$_n$—C(Z$_1$Z$_2$X) wherein, Q represents an alkyl, aryl (including heteroaryl) or heterocyclic group, Y represents a divalent linking group, n represents 0 or 1, Z$_1$ and Z$_2$ each represents a halogen atom, and X represents a hydrogen atom, a halogen atom, or an electron-withdrawing group. Particularly useful compounds of this type are polyhalogen stabilizers wherein Q represents an aryl group, Y represents (C=O) or SO$_2$, n is 1, and Z$_1$, Z$_2$, and X each represent a bromine atom. Examples of such compounds containing —SO$_2$CBr$_3$ groups are described in U.S. Pat. No. 3,874,946 (Costa et al.), U.S. Pat. No. 5,369,000 (Sakizadeh et al.), U.S. Pat. No. 5,464,747 (Sakizadeh et al.) U.S. Pat. No. 5,594,143 (Kirk et al.), U.S. Pat. No. 5,374,514 (Kirk et al.), and U.S. Pat. No. 5,460,938 (Kirk et al.) all of which are incorporated herein by reference. Examples of such compounds include, but are not limited to, 2-tribromomethylsulfonyl-5-methyl-1,3,4-thiadiazole, 2-tribromomethylsulfonylpyridine, 2-tribromomethylsulfonyl-quinoline, and 2-tribromomethylsulfonylbenzene. The polyhalogen stabilizers can be present in one or more layers in a total amount of from about 0.005 to about 0.01 mol/mol of total silver, and preferably from about 0.01 to about 0.05 mol/mol of total silver.

Stabilizer precursor compounds capable of releasing stabilizers upon application of heat during imaging can also be used, as described in U.S. Pat. No. 5,158,866 (Simpson et al.), U.S. Pat. No. 5,175,081 (Krepski et al.), U.S. Pat. No. 5,298,390 (Sakizadeh et al.), and U.S. Pat. No. 5,300,420 (Kenney et al.). Also useful are the blocked aliphatic thiol compounds described in commonly assigned U.S. Pat. No. 7,169,543 (Ramsden et al.) All of the above patents and patent application are incorporated herein by reference.

In addition, certain substituted-sulfonyl derivatives of benzotriazoles may be used as stabilizing compounds as described in U.S. Pat. No. 6,171,767 (Kong et al.).

"Toners" or derivatives thereof that improve the image are desirable components of the photothermographic materials. These compounds, when added to the imaging layer, shift the color of the image from yellowish-orange to brown-black or blue-black. Generally, one or more toners described herein are present in an amount of from about 0.01% to about 10% (more preferably from about 0.1% to about 10%), based on the total dry weight of the layer in which the toner is included. Toners may be incorporated in the photothermographic layer or in an adjacent non-imaging layer.

Compounds useful as toners are described in U.S. Pat. No. 3,080,254 (Grant, Jr.), U.S. Pat. No. 3,847,612 (Winslow), U.S. Pat. No. 4,123,282 (Winslow), U.S. Pat. No. 4,082,901 (Laridon et al.), U.S. Pat. No. 3,074,809 (Owen), U.S. Pat. No. 3,446,648 (Workman), U.S. Pat. No. 3,844,797 (Willems et al.), U.S. Pat. No. 3,951,660 (Hagemann et al.), U.S. Pat. No. 5,599,647 (Defieuw et al.) and GB 1,439,478 (AGFA).

Additional useful toners are substituted and unsubstituted mercaptotriazoles as described in U.S. Pat. No. 3,832,186 (Masuda et al.), U.S. Pat. No. 6,165,704 (Miyake et al.), U.S. Pat. No. 5,149,620 (Simpson et al.), U.S. Pat. No. 6,713,240 (Lynch et al.), and U.S. Pat. No. 6,841,343 (Lynch et al.), all of which are incorporated herein by reference.

Phthalazine and phthalazine derivatives [such as those described in U.S. Pat. No. 6,146,822 (Asanuma et al.), incorporated herein by reference], phthalazinone, and phthalazinone derivatives are particularly useful toners.

The addition of development accelerators that increase the rate of image development and allow reduction in silver coating weight is also useful. Suitable development accelerators include phenols, naphthols, and hydrazine-carboxamides. Such compounds are described, for example, in Y. Yoshioka, K. Yamane, T. Ohzeki, *Development of Rapid Dry Photothermographic Materials with Water-Base Emulsion Coating Method*, AgX 2004: The International Symposium on Silver Halide Technology "At the Forefront of Silver Halide Imaging", Final Program and Proceedings of IS&T and SPSTJ, Ventura, Calif., Sep. 13-15, 2004, pp. 28-31, Society for Imaging Science and Technology, Springfield, Va., U.S. Pat. No. 6,566,042 (Goto et al.), U.S. Patent Application Publications 2004/234906 (Ohzeki et al.), 2005/048422 (Nakagawa), 2005/118542 (Mori et al.), (Nakagawa), and 2006/0014111 (Goto). All of the above documents are incorporated herein by reference.

Thermal solvents (or melt formers) can also be used, including combinations of such compounds (for example, a combination of succinimide and dimethylurea). Thermal solvents are compounds which are solids at ambient temperature but which melt at the temperature used for processing. The thermal solvent acts as a solvent for various components of the heat-developable photosensitive material, it helps to accelerate thermal development and it provides the medium for diffusion of various materials including silver ions and/or complexes, reducing agents and the dyes. Known thermal solvents are disclosed in U.S. Pat. Nos. 3,438,776 (Yudelson), 5,064,753 (noted above) 5,250,386 (Aono et al.), 5,368,979 (Freedman et al.), 5,716,772 (Taguchi et al.), and 6,013,420 (Windender). Thermal solvents are also described in U.S. Pat. No. 7,169,544 (Chen-Ho et al.) All of the above patents are incorporated herein by reference.

The photothermographic materials can also include one or more image stabilizing compounds that are usually incorporated in a "backside" layer. Such compounds can include phthalazinone and its derivatives, pyridazine and its derivatives, benzoxazine and benzoxazine derivatives, benzothiazine dione and its derivatives, and quinazoline dione and its derivatives, particularly as described in U.S. Pat. No. 6,599,685 (Kong). Other useful backside image stabilizers include anthracene compounds, coumarin compounds, benzophenone compounds, benzotriazole compounds, naphthalic acid imide compounds, pyrazoline compounds, or compounds described in U.S. Pat. No. 6,465,162 (Kong et al), and GB 1,565,043 (Fuji Photo). All of these patents and patent applications are incorporated herein by reference.

Phosphors are materials that emit infrared, visible, or ultraviolet radiation upon excitation and can be incorporated into the photothermographic materials. Particularly useful phosphors are sensitive to X-radiation and emit radiation primarily in the ultraviolet, near-ultraviolet, or visible regions of the spectrum (that is, from about 100 to about 700 nm). An intrinsic phosphor is a material that is naturally (that is, intrinsically) phosphorescent. An "activated" phosphor is one composed of a basic material that may or may not be an intrinsic phosphor, to which one or more dopant(s) has been intentionally added. These dopants or activators "activate" the phosphor and cause it to emit ultraviolet or visible radiation. Multiple dopants may be used and thus the phosphor would include both "activators" and "co-activators".

Any conventional or useful phosphor can be used, singly or in mixtures. For example, useful phosphors are described in numerous references relating to fluorescent intensifying screens as well as U.S. Pat. No. 6,440,649 (Simpson et al.) and U.S. Pat. No. 6,573,033 (Simpson et al.) that are directed to photothermographic materials. Some particularly useful phosphors are primarily "activated" phosphors known as phosphate phosphors and borate phosphors. Examples of these phosphors are rare earth phosphates, yttrium phosphates, strontium phosphates, or strontium fluoroborates (including cerium activated rare earth or yttrium phosphates, or europium activated strontium fluoroborates) as described in copending and commonly assigned U.S. Patent Application Publication 2005/0233269 (Simpson et al.). The above patents and patent publication are incorporated herein by reference.

The one or more phosphors can be present in the photothermographic materials in an amount of at least 0.1 mole per mole, and preferably from about 0.5 to about 20 mole, per mole of total silver in the photothermographic material.

As noted above, generally, the amount of total silver is at least $0.002$ mol/m$^2$. While the phosphors can be incorporated into any imaging layer on one or both sides of the support, it is preferred that they be in the same layer(s) as the photosensitive silver halide(s) on one or both sides of the support Binders The photosensitive silver halide, the non-photosensitive source of reducible silver ions, the reducing agent composition, and any other imaging layer additives are generally combined with one or more binders that are generally hydrophobic or hydrophilic in nature. Thus, either aqueous or organic solvent-based formulations can be used to prepare the photothermographic materials. Mixtures of either or both types of binders can also be used. It is preferred that the binder be selected from predominantly hydrophobic polymeric materials (at least 50 dry weight % of total binders).

Examples of typical hydrophobic binders include polyvinyl acetals, polyvinyl chloride, polyvinyl acetate, cellulose acetate, cellulose acetate butyrate, polyolefins, polyesters, polystyrenes, polyacrylonitrile, polycarbonates, methacrylate copolymers, maleic anhydride ester copolymers, butadiene-styrene copolymers, and other materials readily apparent to one skilled in the art. Copolymers (including terpolymers) are also included in the definition of polymers. The polyvinyl acetals (such as polyvinyl butyral, polyvinyl acetal, and polyvinyl formal) and vinyl copolymers (such as polyvinyl acetate and polyvinyl chloride) are particularly preferred. Particularly suitable hydrophobic binders are polyvinyl butyral resins that are available under the names MOWITAL® (Kuraray America, New York, N.Y.), S-LEC® (Sekisui Chemical Company, Troy, Mich.), BUTVAR® (Solutia, Inc., St. Louis, Mo.) and PIOLOFORM® (Wacker Chemical Company, Adrian, Mich.).

Hydrophilic binders or water-dispersible polymeric latex polymers can also be present in the formulations. Examples of useful hydrophilic binders include, but are not limited to, proteins and protein derivatives, gelatin and gelatin-like derivatives (hardened or unhardened), cellulosic materials such as hydroxymethyl cellulose and cellulosic esters, acrylamide/methacrylamide polymers, acrylic/methacrylic polymers polyvinyl pyrrolidones, polyvinyl alcohols, poly(vinyl lactams), polymers of sulfoalkyl acrylate or methacrylates, hydrolyzed polyvinyl acetates, polyacrylamides, polysaccharides and other synthetic or naturally occurring vehicles commonly known for use in aqueous-based photographic emulsions (see for example, *Research Disclosure*, item 38957, noted above). Cationic starches can also be used as a peptizer for tabular silver halide grains as described in U.S. Pat. No. 5,620,840 (Maskasky) and U.S. Pat. No. 5,667,955 (Maskasky).

One embodiment of the polymers capable of being dispersed in aqueous solvent includes hydrophobic polymers such as acrylic polymers, poly(ester), rubber (e.g., SBR resin), poly(urethane), poly(vinyl chloride), poly(vinyl acetate), poly(vinylidene chloride), poly(olefin), and the like. As the polymers above, usable are straight chain polymers, branched polymers, or crosslinked polymers. Also usable are the so-called homopolymers in which single monomer is polymerized, or copolymers in which two or more types of monomers are polymerized. In the case of a copolymer, it may be a random copolymer or a block copolymer. The molecular weight of these polymers is, in number average molecular weight, in the range from 5,000 to 1,000,000, preferably from 10,000 to 200,000. Those having too small molecular weight exhibit insufficient mechanical strength on forming the image-forming layer, and those having too large molecular weight are also not preferred because the filming properties result poor. Further, crosslinking polymer latexes are particularly preferred for use.

Specific examples of preferred polymer latexes are given below, which are expressed by the starting monomers with % by weight given in parenthesis. The molecular weight is given in number average molecular weight. In the case polyfunctional monomer is used, the concept of molecular weight is not applicable because they build a crosslinked structure. Hence, they are denoted as "crosslinking", and the molecular weight is omitted. Tg represents glass transition temperature that is determined using standard procedures.

P-1: Latex of MMA(70)-EA(27)-MAA(3)-(molecular weight 37,000, Tg 61° C.).

P-2: Latex of MMA(70)-2EHA(20)-St(5)-AA(5)-(molecular weight 40,000, Tg 59° C.).

P-3: Latex of -St(50)-Bu(47)-MAA(3)-(crosslinking, Tg 17° C.).

P-4: Latex of -St(68)-Bu(29)-AA(3)-(crosslinking, Tg 17° C.).

P-5: Latex of -St(71)-Bu(26)-AA(3)-(crosslinking, Tg 24° C.).

P-6: Latex of -St(70)-Bu(27)-IA(3)-(crosslinking).

P-7: Latex of -St(75)-Bu(24)-AA(1)-(crosslinking, Tg 29° C.).

P-8: Latex of -St(60)-Bu(35)-DVB(3)MAA(2)-(crosslinking).

P-9: Latex of -St(70)-Bu(25)-DVB(2)-AA(3)-(crosslinking).

P-10: Latex of -VC(50)-MMA(20)-EA(20)-AN(5)-AA(5)-(molecular weight 80,000).

P-11: Latex of -VDC(85)MMA(5)EA(5)-MAA(5)-(molecular weight 67,000).

P-12: Latex of -Et(90)-MAA(10)-(molecular weight 12,000).

P-13: Latex of -St(70)-2EHA(27)-AA(3)-(molecular weight 130,000, Tg 43° C.).

P-14: Latex of -MMA(63)-EA(35)-AA(2)-(molecular weight 33,000, Tg 47° C.).

P-15: Latex of -St(70.5)-Bu(26.5)-AA(3)-(crosslinking, Tg 23° C.).

P-16: Latex of -St(69.5)-Bu(27.5)-AA(3)-(crosslinking, Tg 20.5° C.).

In the structures above, abbreviations represent monomers as follows: MMA: methyl methacrylate, EA: ethyl acrylate, MAA: methacrylic acid, 2EHA: 2-ethylhexyl acrylate, St: styrene, Bu: butadiene, AA: acrylic acid, DVB: divinylbenzene, VC: vinyl chloride, AN: acrylonitrile, VDC: vinylidene chloride, Et: ethylene, IA: itaconic acid.

The polymer latexes above are commercially available, and polymers below are usable. As examples of acrylic polymers, there can be mentioned Cevian A-4635, 4718, and 4601 (all manufactured by Daicel Chemical Industries, Ltd.), Nipol Lx811, 814, 821, 820, and 857 (all manufactured by Nippon Zeon Co., Ltd.), and the like. As examples of poly(ester), there can be mentioned FINETEX ES650, 611, 675, and 850 (all manufactured by Dainippon Ink and Chemicals, Inc.), WD-size and WMS (all manufactured by Eastman Chemical Co.), and the like. As examples of poly(urethane), there can be mentioned HYDRAN AP10, 20, 30, and 40 (all manufactured by Dainippon Ink and Chemicals, Inc.), and the like. As examples of rubber, there can be mentioned LACSTAR 7310K, 3307B, 4700H, and 7132C (all manufactured by Dainippon Ink and Chemicals, Inc.), Nipol Lx416, 410, 438C, and 2507 (all manufactured by Nippon Zeon Co., Ltd.), and the like. As examples of poly(vinyl chloride), there can be mentioned G351 and G576 (all manufactured by Nippon Zeon Co., Ltd.), and the like. As examples of poly(vinylidene chloride), there can be mentioned L502 and L513 (all manufactured by Asahi Chemical Industry Co., Ltd.), and the like. As examples of poly(olefin), there can be mentioned Chemipearl S120 and SA100 (all manufactured by Mitsui Petrochemical Industries, Ltd.), and the like.

The polymer latexes above may be used alone, or may be used by blending two types or more depending on the needs.

Particularly preferable as the polymer latex for use as a binder is that of styrene-butadiene copolymer. The weight ratio of monomer unit for styrene to that of butadiene constituting the styrene-butadiene copolymer is preferably in the range of from 40:60 to 95:5. Further, the monomer unit of styrene and that of butadiene preferably account for 60% by weight to 99% by weight with respect to the copolymer. Moreover, the polymer latex contains acrylic acid or methacrylic acid, preferably, in the range from 1% by weight to 6% by weight, and more preferably, from 2% by weight to 5% by weight, with respect to the total weight of the monomer unit of styrene and that of butadiene. The preferred range of the molecular weight is the same as that described above.

As preferred latexes of styrene-butadiene copolymers, there can be mentioned P-3 to P-8 and P-15, or commercially available LACSTAR-3307B, 7132C, Nipol Lx416, and the like. Such latexes are described in U.S. Patent Application Publication 2005/0221237 (Sakai et al.) that is incorporated herein by reference.

Hardeners for various binders may be present if desired. Useful hardeners are well known and include diisocyanate compounds as described in EP 0 600 586 B 1 (Philip, Jr. et al.), vinyl sulfone compounds as described in U.S. Pat. No. 6,143,487 (Philip, Jr. et al.) and EP 0 640 589 A1 (Gathmann et al.), aldehydes and various other hardeners as described in U.S. Pat. No. 6,190,822 (Dickerson et al.). The hydrophilic binders used in the photothermographic materials are generally partially or fully hardened using any conventional hardener. Useful hardeners are well known and are described, for example, in T. H. James, *The Theory of the Photographic Process*, Fourth Edition, Eastman Kodak Company, Rochester, N.Y., 1977, Chapter 2, pp. 77-8.

Where the proportions and activities of the photothermographic materials require a particular developing time and temperature, the binder(s) should be able to withstand those conditions. When a hydrophobic binder is used, it is preferred that the binder (or mixture thereof) does not decompose or lose its structural integrity at 120° C. for 60 seconds. When a hydrophilic binder is used, it is preferred that the binder does not decompose or lose its structural integrity at 150° C. for 60 seconds. It is more preferred that the binder not decompose or lose its structural integrity at 177° C. for 60 seconds.

The polymer binder(s) is used in an amount sufficient to carry the components dispersed therein. Preferably, a binder is used at a level of from about 10% to about 90% by weight (more preferably at a level of from about 20% to about 70% by weight) based on the total dry weight of the layer. It is particularly useful that the photothermographic materials include at least 50 weight % hydrophobic binders in both imaging and non-imaging layers on both sides of the support (and particularly the imaging side of the support).

Support Materials

The photothermographic materials comprise a polymeric support that is preferably a flexible, transparent film that has any desired thickness and is composed of one or more polymeric materials. They are required to exhibit dimensional stability during thermal development and to have suitable adhesive properties with overlying layers. Useful polymeric materials for making such supports include polyesters [such as poly(ethylene terephthalate) and poly(ethylene naphthalate)], cellulose acetate and other cellulose esters, polyvinyl acetal, polyolefins, polycarbonates, and polystyrenes. Preferred supports are composed of polymers having good heat stability, such as polyesters and polycarbonates. Support materials may also be treated or annealed to reduce shrinkage and promote dimensional stability.

It is also useful to use transparent, multilayer, polymeric supports comprising numerous alternating layers of at least two different polymeric materials as described in U.S. Pat. No. 6,630,283 (Simpson et al.). Another support comprises dichroic mirror layers as described in U.S. Pat. No. 5,795,708 (Boutet). Both of the above patents are incorporated herein by reference.

Opaque supports can also be used, such as dyed polymeric films and resin-coated papers that are stable to high temperatures.

Support materials can contain various colorants, pigments, antihalation or acutance dyes if desired. For example, the support can include one or more dyes that provide a blue color in the resulting imaged film. Support materials may be treated using conventional procedures (such as corona discharge) to improve adhesion of overlying layers, or subbing or other adhesion-promoting layers can be used.

Photothermographic Formulations and Constructions

An organic solvent-based coating formulation for the photothermographic emulsion layer(s) can be prepared by mixing the various components with one or more binders in a suitable organic solvent system that usually includes one or more solvents such as toluene, 2-butanone (methyl ethyl ketone), acetone, or tetrahydrofuran, or mixtures thereof. Methyl ethyl ketone is a preferred coating solvent.

Alternatively, the desired imaging components can be formulated with a hydrophilic binder (such as gelatin, or a gelatin-derivative), or a hydrophobic water-dispersible polymer latex (such as a styrene-butadiene latex) in water or water-organic solvent mixtures to provide aqueous-based coating formulations.

The photothermographic materials can contain plasticizers and lubricants such as poly(alcohols) and diols as described in U.S. Pat. No. 2,960,404 (Milton et al.), fatty acids or esters as described in U.S. Pat. Nos. 2,588,765 (Robijns) and 3,121,060 (Duane), and silicone resins as described in GB 955,061 (DuPont). The materials can also contain inorganic and organic matting agents as described in U.S. Pat. Nos. 2,992,101 (Jelley et al.) and 2,701,245 (Lynn). Polymeric fluorinated surfactants may also be useful in one or more layers as described in U.S. Pat. No. 5,468,603 (Kub).

The photothermographic materials may also include a surface protective layer over the one or more emulsion layers. Layers to reduce emissions from the material may also be present, including the polymeric barrier layers described in U.S. Pat. Nos. 6,352,819 (Kenney et al.), 6,352,820 (Bauer et al.), 6,420,102 (Bauer et al.), 6,667,148 (Rao et al.), and 6,746,831 (Hunt), all incorporated herein by reference.

U.S. Pat. No. 6,436,616 (Geisler et al.), incorporated herein by reference, describes various means of modifying photothermographic materials to reduce what is known as the "woodgrain" effect, or uneven optical density.

The photothermographic materials can include one or more antistatic or conductive layers agents in any of the layers on either or both sides of the support. Conductive components include soluble salts, evaporated metal layers, or ionic polymers as described in U.S. Pat. No. 2,861,056 (Minsk) and U.S. Pat. No. 3,206,312 (Sterman et al.), insoluble inorganic salts as described in U.S. Pat. No. 3,428,451 (Trevoy), electroconductive underlayers as described in U.S. Pat. No. 5,310,640 (Markin et al.), electronically-conductive metal antimonate particles as described in U.S. Pat. No. 5,368,995 (Christian et al.), and electrically-conductive metal-containing particles dispersed in a polymeric binder as described in EP 0 678 776 A1 (Melpolder et al.). Particularly useful conductive particles are the non-acicular metal antimonate particles used in a buried backside conductive layer as described in U.S. Pat. No. 6,689,546 (LaBelle et al.), U.S. Patent Application Publication 2006/0046932 (Ludemann et al.), and in U.S. Pat. No. 7,087,364. (Ludemann et al.). U.S. Pat. No. 7,067,242 (Ludemann et al.) All of the above patents and patent applications are incorporated herein by reference.

It is particularly useful that the conductive layers be disposed on the backside of the support and especially where they are buried or underneath one or more other layers such as backside protective layer(s). Such backside conductive layers typically have a resistivity of about $10^5$ to about $10^{12}$ ohm/sq as measured using a salt bridge water electrode resistivity measurement technique. This technique is described in R. A. Elder *Resistivity Measurements on Buried Conductive Layers*, EOS/ESD Symposium Proceedings, Lake Buena Vista, Fla., 1990, pp. 251-254, incorporated herein by reference. [EOS/ESD stands for Electrical Overstress/Electrostatic Discharge].

Still other conductive compositions include one or more fluoro-chemicals each of which is a reaction product of $R_f$—$CH_2CH_2$—$SO_3H$ with an amine wherein $R_f$ comprises 4 or more fully fluorinated carbon atoms as described in U.S. Pat. No. 6,699,648 (Sakizadeh et al.) that is incorporated herein by reference.

Additional conductive compositions include one or more fluoro-chemicals described in more detail in U.S. Pat. No. 6,762,013 (Sakizadeh et al.) that is incorporated herein by reference.

The photothermographic materials may also usefully include a magnetic recording material as described in *Research Disclosure*, Item 34390, November 1992, or a transparent magnetic recording layer such as a layer containing magnetic particles on the underside of a transparent support as described in U.S. Pat. No. 4,302,523 (Audran et al.), incorporated herein by reference.

To promote image sharpness, the photothermographic materials can contain one or more layers containing acutance and/or antihalation dyes. These dyes are chosen to have absorption close to the exposure wavelength and are designed to absorb scattered light. One or more antihalation compositions may be incorporated into the support, backside layers, underlayers, or overcoat layers. Additionally, one or more acutance dyes may be incorporated into one or more frontside imaging layers.

Dyes useful as antihalation and acutance dyes include squaraine dyes as described in U.S. Pat. Nos. 5,380,635 (Gomez et al.), and 6,063,560 (Suzuki et al.), and EP 1 083 459A1 (Kimura), indolenine dyes as described in EP 0 342

810A1 (Leichter), and cyanine dyes as described in U.S. Pat. No. 6,689,547 (Hunt et al.), all incorporated herein by reference.

It may also be useful to employ compositions including acutance or antihalation dyes that will decolorize or bleach with heat during processing as described in U.S. Pat. Nos. 5,135,842 (Kitchin et al.), 5,266,452 (Kitchin et al.), 5,314,795 (Helland et al.), and 6,306,566, (Sakurada et al.), and Japanese Kokai 2001-142175 (Hanyu et al.) and 2001-183770 (Hanye et al.). Useful bleaching compositions are described in Japanese Kokai 11-302550 (Fujiwara), 2001-109101 (Adachi), 2001-51371 (Yabuki et al.), and 2000-029168 (Noro). All of the noted publications are incorporated herein by reference.

Other useful heat-bleachable antihalation compositions can include an infrared radiation absorbing compound such as an oxonol dye or various other compounds used in combination with a hexaarylbiimidazole (also known as a "HABI"), or mixtures thereof. HABI compounds are described in U.S. Pat. No. 4,196,002 (Levinson et al.), U.S. Pat. No. 5,652,091 (Perry et al.), and U.S. Pat. No. 5,672,562 (Perry et al.), all incorporated herein by reference. Examples of such heat-bleachable compositions are described for example in U.S. Pat. Nos. 6,455,210 (Irving et al.), 6,514,677 (Ramsden et al.), and 6,558,880 (Goswami et al.), all incorporated herein by reference.

Under practical conditions of use, these compositions are heated to provide bleaching at a temperature of at least 90° C. for at least 0.5 seconds (preferably, at a temperature of from about 100° C. to about 200° C. for from about 5 to about 20 seconds).

Mottle and other surface anomalies can be reduced in the materials by incorporation of a fluorinated polymer as described for example in U.S. Pat. No. 5,532,121 (Yonkoski et al.) or by using particular drying techniques as described, for example in U.S. Pat. No. 5,621,983 (Ludemann et al.).

It is preferable for the photothermographic material to include one or more radiation absorbing substances that are generally incorporated into one or more photothermographic layer(s)to provide a total absorbance of all layers on that side of the support (or an optical density) of at least 0.1 (preferably of at least 0.6) at the exposure wavelength of the photothermographic material. Where the imaging layers are on one side of the support only, it is also desired that the total absorbance (or optical density) at the exposure wavelength for all layers on the backside (non-imaging) side of the support be at least 0.2.

The photothermographic formulations of can be coated by various coating procedures including wire wound rod coating, dip coating, air knife coating, curtain coating, slide coating, or extrusion coating using hoppers of the type described in U.S. Pat. No. 2,681,294 (Beguin). Layers can be coated one at a time, or two or more layers can be coated simultaneously by the procedures described in U.S. Pat. Nos. 2,761,791 (Russell), 4,001,024 (Dittman et al.), 4,569,863 (Keopke et al.), 5,340,613 (Hanzalik et al.), 5,405,740 (LaBelle), 5,415,993 (Hanzalik et al.), 5,525,376 (Leonard), 5,733,608 (Kessel et al.), 5,849,363 (Yapel et al.), 5,843,530 (Jerry et al.), and 5,861,195 (Bhave et al.), and GB 837,095 (Ilford). A typical coating gap for the emulsion layer can be from about 10 to about 750 µm, and the layer can be dried in forced air at a temperature of from about 20° C. to about 100° C. It is preferred that the thickness of the layer be selected to provide maximum image densities greater than about 0.2, and more preferably, from about 0.5 to 5.0 or more, as measured by an X-rite Model 361/V Densitometer equipped with 301 Visual Optics, available from X-rite Corporation, (Granville, Mich.).

Preferably, two or more layer formulations are simultaneously applied to a support using slide coating, the first layer being coated on top of the second layer while the second layer is still wet. The first and second fluids used to coat these layers can be the same or different solvents. For example, subsequently to, or simultaneously with, application of the emulsion formulation(s) to the support, a protective overcoat formulation can be applied over the emulsion formulation. Simultaneous coating can be used to apply layers on the frontside, backside, or both sides of the support.

In other embodiments, a "carrier" layer formulation comprising a single-phase mixture of two or more polymers described above may be applied directly onto the support and thereby located underneath the emulsion layer(s) as described in U.S. Pat. No. 6,355,405 (Ludemann et al.), incorporated herein by reference. The carrier layer formulation can be simultaneously applied with application of the emulsion layer formulation(s) and any overcoat or surface protective layers.

While the first and second layers can be coated on one side of the film support, manufacturing methods can also include forming on the opposing or backside of the polymeric support, one or more additional layers, including a conductive layer, antihalation layer, or a layer containing a matting agent (such as silica), or a combination of such layers. Alternatively, one backside layer can perform all of the desired functions.

In a preferred construction, a conductive "carrier" layer formulation comprising a single-phase mixture of two or more polymers and non-acicular metal antimonate particles, may be applied directly onto the backside of the support and thereby be located underneath other backside layers. The carrier layer formulation can be simultaneously applied with application of these other backside layer formulations.

It is particularly contemplated that the photothermographic materials include emulsion layers on both sides of the support and/or an antihalation underlayer beneath at least one emulsion layer. Thus, the outermost protective layers can be disposed on both sides of the support.

Layers to promote adhesion of one layer to another are also known, as described in U.S. Pat. Nos. 5,891,610 (Bauer et al.), 5,804,365 (Bauer et al.), and 4,741,992 (Przezdziecki). Adhesion can also be promoted using specific polymeric adhesive materials as described in U.S. Pat. No. 5,928,857 (Geisler et al.).

Imaging/Development

The photothermographic materials can be imaged in any suitable manner consistent with the type of material, using any suitable imaging source to which they are sensitive. In most embodiments, the materials are sensitive to radiation in the range of from about at least 100 nm to about 1400 nm. In some embodiments, they materials are sensitive to radiation in the range of from about 300 nm to about 600 nm, more preferably from about 300 to about 450 nm, even more preferably from a wavelength of from about 360 to 420 nm. In preferred embodiments the materials are sensitized to radiation from about 600 to about 1200 nm and more preferably to infrared radiation from about 700 to about 950 nm. If necessary, sensitivity to a particular wavelength can be achieved by using appropriate spectral sensitizing dyes.

Imaging can be carried out by exposing the photothermographic materials to a suitable source of radiation to which they are sensitive, including X-radiation, ultraviolet radiation, visible light, near infrared radiation, and infrared radiation to provide a latent image. Suitable exposure means are well known and include phosphor emitted radiation (particularly X-ray induced phosphor emitted radiation), incandescent or fluorescent lamps, xenon flash lamps, lasers, laser diodes, light emitting diodes, infrared lasers, infrared laser diodes, infrared light-emitting diodes, infrared lamps, or any other ultraviolet, visible, or infrared radiation source readily apparent to one skilled in the art such as described in *Research Disclosure*, item 38957 (noted above). Particularly useful infrared exposure means include laser diodes, including laser diodes that are modulated to increase imaging efficiency using what is known as multi-longitudinal exposure techniques as described in U.S. Pat. No. 5,780,207 (Mohapatra et al.). Other exposure techniques are described in U.S. Pat. No. 5,493,327 (McCallum et al.).

The photothermographic materials also can be indirectly imaged using an X-radiation imaging source and one or more prompt-emitting or storage X-radiation sensitive phosphor screens adjacent to the photothermographic material. The phosphors emit suitable radiation to expose the photothermographic material. Preferred X-ray screens are those having phosphors emitting in the near ultraviolet region of the spectrum (from 300 to 400 nm), in the blue region of the spectrum (from 400 to 500 nm), and in the green region of the spectrum (from 500 to 600 nm).

In other embodiments, the photothermographic materials can be imaged directly using an X-radiation imaging source to provide a latent image.

Thermal development conditions will vary, depending on the construction used but will typically involve heating the imagewise exposed photo-thermographic material at a suitably elevated temperature, for example, at from about 50° C. to about 250° C. (preferably from about 80° C. to about 200° C. and more preferably from about 100° C. to about 200° C.) for a sufficient period of time, generally from about 1 to about 120 seconds. Heating can be accomplished using any suitable heating means such as contacting the material with a heated drum, plates, or rollers, or by providing a heating resistance layer on the rear surface of the material and supplying electric current to the layer so as to heat the material. A preferred heat development procedure for photothermographic materials includes heating at from 130° C. to about 165° C. for from about 3 to about 25 seconds (and preferably for 20 seconds or less). Thermal development is carried out with a photothermographic material in a substantially water-free environment and without application of any solvent to the material.

Use as a Photomask

The photothermographic materials can be sufficiently transmissive in the range of from about 350 to about 450 nm in non-imaged areas to allow their use in a method where there is a subsequent exposure of an ultraviolet or short wavelength visible radiation sensitive imageable medium. The heat-developed materials absorb ultraviolet or short wavelength visible radiation in the areas where there is a visible image and transmit ultraviolet or short wavelength visible radiation where there is no visible image. The heat-developed materials may then be used as a mask and positioned between a source of imaging radiation (such as an ultraviolet or short wavelength visible radiation energy source) and an imageable material that is sensitive to such imaging radiation, such as a photopolymer, diazo material, photoresist, or photosensitive printing plate. Exposing the imageable material to the imaging radiation through the visible image in the exposed and heat-developed photothermographic material provides an image in the imageable material. This method is particularly useful where the imageable medium comprises a printing plate and the photothermographic material serves as an imagesetting film.

Thus, the present invention provides a method of forming a visible image comprising:

(A) imagewise exposing the photothermographic material that has a transparent support to electromagnetic radiation to form a latent image, (B) simultaneously or sequentially, heating said exposed photothermographic material for sufficient time of 20 seconds or less and within a temperature range of from 110 to 150° C. to develop said latent image into a visible image having a $D_{max}$ of at least 3.0.

(C) positioning the exposed and heat-developed photothermographic material between a source of imaging radiation and an imageable material that is sensitive to the imaging radiation, and (D) exposing the imageable material to the imaging radiation through the visible image in the exposed and heat-developed photothermographic material to provide an image in the imageable material.

The following examples are provided to illustrate the practice of the present invention and the invention is not meant to be limited thereby.

MATERIALS AND METHODS FOR THE EXAMPLES

All materials used in the following examples are readily available from standard commercial sources, such as Aldrich Chemical Co. (Milwaukee Wis.) unless otherwise specified. All percentages are by weight unless otherwise indicated. The following additional terms and materials were used.

The bicyclic or tricyclic reducing agents used herein were prepared using known synthetic methods. In particular, the isobornyl substituted developer (o-BTBP-1) was prepared by the method of U.S. Pat. No. 2,628,953 (Newby) and is believed to be a mixture of isomers. Norbornyl substituted developer (o-BTBP-5) was prepared by the method of U.S. Pat. No. 4,548,976 (DeRoche et al.).

Many of the chemical components used herein are provided as a solution. The term "active ingredient" means the amount or the percentage of the desired chemical component contained in a sample. All amounts listed herein are the amount of active ingredient added unless otherwise specified.

PARALOID® A-21 is an acrylic copolymer available from Rohm and Haas (Philadelphia, Pa.).

BZT is benzotriazole.

CAB 171-1SS is a cellulose acetate butyrate resin available from Eastman Chemical Co (Kingsport, Tenn.).

DESMODUR® N3300 is a trimer of an aliphatic hexamethylene diisocyanate available from Bayer Chemicals (Pittsburgh, Pa.).

PIOLOFORM® BL-16 is reported to be a polyvinyl butyral resin having a glass transition temperature of about 84° C. PIOLOFORM® BM-18 is reported to be a polyvinyl butyral resin having glass transition temperature of about 70° C. Both are available from Wacker Polymer Systems (Adrian, Mich.).

MEK is methyl ethyl ketone (or 2-butanone).

Vinyl Sulfone-1 (VS-1) is described in U.S. Pat. No. 6,143,487 and has the structure shown below.

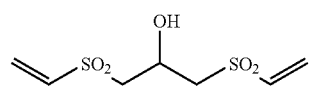

(VS-1)

Antifoggant AF-A is 2-pyridyltribromomethylsulfone and has the structure shown below.

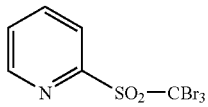

(AF-A)

Antifoggant AF-B is ethyl-2-cyano-3-oxobutanoate. It is described in U.S. Pat. No. 5,686,228 (Murray et al.) and has the structure shown below.

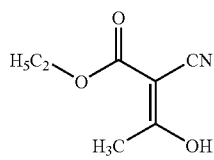

(AF-B)

Acutance Dye AD-1 has the following structure:

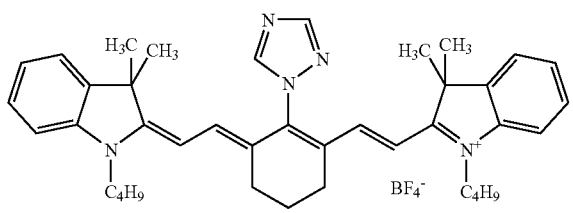

(AD-1)

Tinting Dye TD-1 has the following structure:

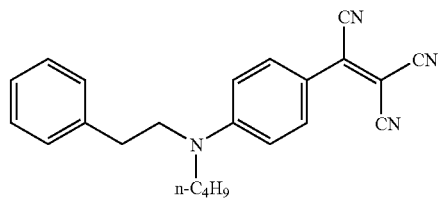

(TD-1)

Sensitizing Dye A is described in U.S. Pat. No. 5,541,054 (Miller et al.) has the structure shown below.

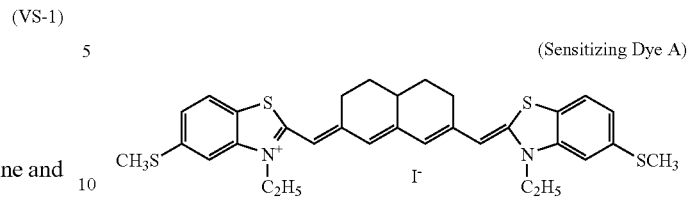

(Sensitizing Dye A)

Support Dye SD-1 has the following structure:

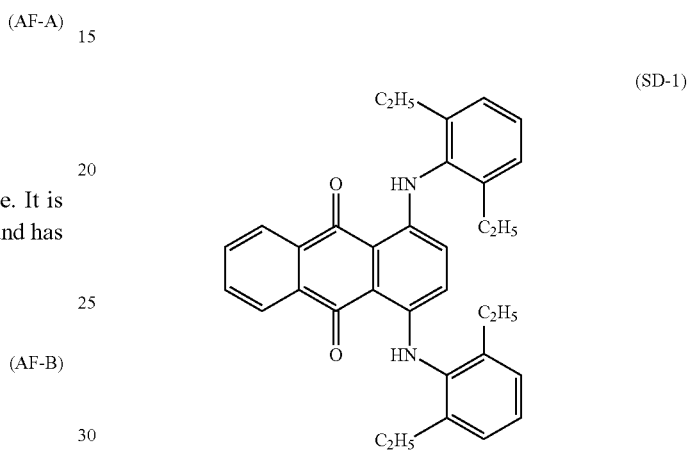

(SD-1)

The following comparative compounds were used. $R_1$, $R_1'R_2$, $R_2'$ and Z are as defined above for Structure (I).

| Compound | $R_1, R_1'$ | $R_2, R_2'$ | Z |
| --- | --- | --- | --- |
| CD-1 | $CH_3$ | $CH_3$ | $CH(n\text{-}Pr)$ |
| CD-2 | 1-methylcyclohexyl | $CH_3$ | $CH_2$ |
| CD-3 | cyclopentyl | $CH_3$ | $CH_2$ |
| CD-4 | $t\text{-}C_4H_9$ | $CH_3$ | $CH_2$ |

EXAMPLE

The following example demonstrates that bis-phenol reducing agents having bicyclic or tricyclic substituents ortho to the hydroxyl group when used in photothermographic emulsion layer formulations provides improved silver efficiency, hot-dark print stability, and hot-light $D_{min}$ stability.

Preparation of Photothermographic Emulsion Formulation:

A photothermographic emulsion formulation was prepared as follows:

A preformed silver halide, silver carboxylate soap dispersion, was prepared in similar fashion to that described in U.S. Pat. No. 5,939,249 (noted above). The core shell silver halide emulsion had a silver iodobromide core with 8% iodide, and a silver bromide shell doped with iridium and copper. The core made up 25% of each silver halide grain, and the shell made up the remaining 75%. The silver halide grains were cubic in shape, and had a mean grain size between 0.055 and 0.06 μm. The preformed silver halide, silver carboxylate soap dispersion was made by mixing 26.1% preformed silver halide, silver carboxylate soap, 2.1% PIOLOFORM® BM-18 polyvinyl butyral binder, and 71.8% MEK, and homogenizing three times at 8000 psi (55 MPa).

A photothermographic emulsion formulation was prepared containing 174 parts of the above preformed silver halide, silver carboxylate soap dispersion and 17.6 parts of MEK. To this formulation was added 1.6 parts of a 15% solution of pyridinium hydrobromide perbromide in methanol, with stirring. After 45 minutes of mixing, 2.1 parts of an 11% zinc bromide solution in methanol was added. Stirring was continued and after 30 minutes, a solution of 0.15 parts 2-mercapto-5-methylbenzimidazole, 0.007 parts of Sensitizing Dye A, 1.7 parts of 2-(4-chlorobenzoyl)benzoic acid, 10.8 parts of methanol, and 3.8 parts of MEK were added. After stirring for 75 minutes, the temperature was lowered to 10° C., and 26 parts of PIOLOFORM® BM 18 and 20 parts of PIOLOFORM® BL 16 were added. Mixing was continued for another 15 minutes.

The formulation was completed by adding the materials shown below. Five minutes were allowed between the additions of each component.

| Solution A containing: | |
| --- | --- |
| Antifoggant AF-A | 0.80 parts |
| Tetrachlorophthalic acid (TCPA) | 0.37 parts |
| 4-Methylphthalic acid (4 MPA) | 0.71 parts |
| MEK | 21 parts |
| Methanol | 0.36 parts |
| Reducing Agent | See TABLE II |
| DESMODUR ® N3300 | 0.66 parts in 0.33 parts MEK |
| Phthalazine (PHZ) | 1.3 parts in 6.3 parts MEK |

Topcoat Formulation:

Topcoat formulations were prepared by mixing the following materials:

| MEK | 83 parts |
| --- | --- |
| PARALOID ® A-21 | 0.59 parts |
| CAB 171-15S | 6.4 parts |
| Vinyl Sulfone VS-1 | 0.3 parts, 80% active (0.24 parts net) |
| Benzotriazole (BZT) | See TABLE II |
| Acutance Dye AD-1 | 0.09 parts |
| Antifoggant AF-B | 0.16 parts |
| DESMODUR ® N3300 Solution | 0.48 parts, in 0.24 parts MEK |
| Tinting Dye TD-1 | 0.004 parts |

Preparation of Photothermographic Materials:

The photothermographic emulsion and topcoat formulations were simultaneously coated onto a 7 mil (178 µm) polyethylene terephthalate support, tinted blue with support dye SD-1. An automated dual knife coater equipped with an in-line dryer was used. Immediately after coating, samples were dried in a forced air oven at between 80 and 95° C. for between 4 and 6 minutes. The photothermographic emulsion formulation was coated to obtain a coating weight of between about 1.8 and 2.0 g of total silver/m$^2$ (between about 0.0158 and 0.0185 mol/m$^2$). The topcoat formulation was coated to obtain about a dry coating weight of about 0.2 g/ft$^2$ (2.2 g/m$^2$) and an absorbance in the imaging layer of about 1.0 at 810 nm.

The backside of the support had been coated with an antihalation and antistatic layer having an absorbance greater than 0.3 between 805 and 815 nm, and a resistivity of less than 1011 ohms/square.

Samples of each photothermographic material were cut into strips, exposed with a laser sensitometer at 810 nm, and thermally developed to generate continuous tone wedges with image densities varying from a minimum density ($D_{min}$) to a maximum density ($D_{max}$) possible for the exposure source and development conditions. Development was carried out on a 6 inch diameter (15.2 cm) heated rotating drum. The strip contacted the drum for 210 degrees of its revolution, about 11 inches (28 cm). Samples were developed at 122.5° C. for 15 seconds at a rate of 0.733 inches/sec (112 cm/min)

A strip sample of each photothermographic material was scanned using a computerized densitometer equipped with both a visible filter and a blue filter having peak transmission at about 440 nm. The $D_{min}$, $D_{max}$, Silver Efficiency, and Speed-2 using the visible filter are shown in TABLE II.

Calculation of Silver Efficiency:

Silver efficiency was calculated for each sample by dividing $D_{max}$ by the silver coating weight. The silver coating weight of each film sample was measured by X-ray fluorescence using commonly known techniques. Control Sample 1-1 is shown in TABLE II as 100. The silver efficiency for all other Comparative and Inventive Samples is shown relative to Comparative Sample 1-1.

Evaluation of Hot-Dark Print Stability:

A continuous tone wedge strip sample of each developed photothermographic coating prepared above, was illuminated with fluorescent lighting for 3 hours at 70° F. (21° C.) and 50% relative humidity. The illumination at the surface of each strip sample was 90 to 120 foot candles (968 to 1291 lux). Each sample was then re-scanned using the same computer densitometer and using the blue filter having a peak transmittance at about 440 nm. The $D_{min}$ and point on the strip having an optical density of approximately 1.2 were recorded.

A set of processed samples was then stacked together and tightly double-bagged in two high-density, flat-black polyethylene bags. Three strips of polyethylene terephthalate support tinted blue with support dye SD-1 were placed above and below the stack of film samples. The bagged samples were then placed in an oven and heated at 68-74° C. for 3 hours. Upon cooling to room temperature, the samples were removed from the bag and re-scanned using the same densitometer and blue filter. The change in $D_{min}$ ($\Delta D_{min}$) was recorded to determine the hot-dark print Stability. The change in $D_{min}$ ($\Delta D_{min}$) for Control Sample 1-1 is shown in TABLE III as 100. The $\Delta D_{min}$ for all other Comparative and Inventive Samples is shown relative to Comparative Sample 1-1. The change in the sample where the optical density was approximately 1.2 was also recorded in this manner.

The results, shown below in TABLE III demonstrate the unique ability of bis-phenols having bicyclic or tricyclic substitution ortho to the hydroxyl group to provide improved hot-dark print stability.

Evaluation of Hot-Light $D_{min}$ Stability:

The $D_{min}$ of continuous tone wedge strip samples of each developed photothermographic coating prepared above, was measured using an X-rite Model 310T Densitometer equipped with 301 Visual Optics [available from X-rite Corporation, (Granville, Mich.)]. Two measurements were made on each sample. The first measurement was recorded using the visible filter ($D_{minVis}$). The second measurement was recorded using the blue filter ($D_{minBlue}$). The samples were then placed in a temperature and humidity controlled light chamber where they were exposed for 20 hours at about 120° F. (49° C.) and 20% relative humidity to 1,200 foot-candles (12,960 lux) of fluorescent light (Philips TL-D 90 58W/940 bulbs). Samples were removed from the light chamber, allowed to cool to room temperature, and $D_{minVis}$ and $D_{minBlue}$ were again measured using the same densitometer. The change in $D_{min}$ before and after storage using each of these filters was recorded ($\Delta D_{minBlue}$) and $\Delta D_{minVis}$). These differences were then added together ($\Delta D_{minBlue}$+ $\Delta D_{minVis}$) to determine the total hot-light $D_{min}$ Stability ($\Delta D_{minTotal}$). The total hot-light change in $D_{min}$ ($\Delta D_{minTotal}$) for Comparative Sample 1-1 is shown in TABLE III as 100. The $\Delta D_{minTotal}$ for all other Comparative and Inventive Samples is shown relative to Comparative Sample 1-1.

The results, shown below in TABLE III demonstrate the unique ability of bis-phenols having bicyclic or tricyclic substitution ortho to the hydroxyl group to provide less change in hot-light $D_{minTotal}$ stability.

Discussion:

The reducing agent used in Comparative Sample 1-1 (CD-1) has a primary alkyl substituent ortho to the hydroxyl group ($R_1$, $R_1'$=methyl). The reducing agent used in Comparative Sample 1-2 (CD-2) has a tertiary and cyclic substituent ortho to the hydroxyl group ($R_1$, $R_1'$=1-methyl-cyclohexyl). The reducing agent used in Comparative Sample 1-3 (CD-3) has a secondary and cyclic substituent ortho to the hydroxyl group ($R_1$, $R_1'$=cyclopentyl), and the compound used in Comparative Sample 1-4 (CD-4) has substitution that is tertiary alkyl ortho to the hydroxyl group ($R_1$, $R_1'$=t-butyl). The high $\Delta D_{min}$ values for all samples incorporating these compounds indicate both their poorer hot-dark print stability and hot-light $D_{minTotal}$ stability when compared to bis-phenols having substituents that are bicyclic or tricyclic located ortho to the hydroxyl group.

TABLE III

| Sample | $\Delta Dmin$ After 3 Hours Hot-Dark Print Stability | $\Delta OD$ at 1.2 After 3 Hours Hot-Dark Print Stability | $\Delta Dmin$ After 20 Hours Hot-Light DminTotal Stability |
|---|---|---|---|
| 1-1-Comparative | 100 | 100 | 100 |
| 1-2-Comparative | 847 | 243 | 57 |
| 1-3-Comparative | 197 | 184 | 106 |
| 1-4-Comparative | 1500 | 313 | 117 |
| 1-5-Inventive | 42 | 67 | 24 |
| 1-6-Inventive | 27 | 34 | 25 |
| 1-7-Inventive | 32 | 62 | 33 |
| 1-8-Inventive | 33 | 57 | 16 |
| 1-9-Inventive | 26 | 43 | 25 |
| 1-10-Inventive | 37 | 49 | 30 |
| 1-11-Inventive | 35 | 48 | 25 |
| 1-12-Inventive | 40 | 58 | 31 |
| 1-13-Inventive | 36 | 52 | 25 |
| 1-14-Inventive | 33 | 46 | 25 |
| 1-15-Inventive | 39 | 68 | 29 |
| 1-16-Inventive | 37 | 65 | 28 |
| 1-17-Inventive | 33 | 49 | 20 |
| 1-18-Inventive | 40 | 53 | 41 |
| 1-19-Inventive | 50 | 62 | 42 |
| 1-20-Inventive | 70 | 100 | 52 |
| 1-21-Inventive | 56 | 85 | 39 |
| 1-22-Inventive | 61 | 88 | 33 |
| 1-23-Inventive | 44 | 86 | 25 |

The invention has been described in detail with particular reference to certain preferred embodiments thereof, but it will be understood that variations and modifications can be effected within the spirit and scope of the invention.

The invention claimed is:

1. A photothermographic material comprising a support and having on at least one side thereof a photothermographic layer and comprising, in reactive association:

TABLE II

| Sample | Reducing Agent | Amount (parts) | BZT Amount (parts) | Dmin | Dmax | Silver Efficiency (Dmax/Ag Coating Wt.) | Speed-2 |
|---|---|---|---|---|---|---|---|
| 1-1-Comparative | CD-1 | 9.5 | 0.18 | 100 | 100 | 100 | 100 |
| 1-2-Comparative | CD-2 | 13.4 | 0.18 | 114 | 96 | 106 | 109 |
| 1-3-Comparative | CD-3 | 11.6 | 0.18 | 101 | 98 | 104 | 105 |
| 1-4-Comparative | CD-4 | 10.8 | 0.18 | 141 | 109 | 107 | 118 |
| 1-5-Inventive | o-BTP-1 | 15.9 | 0.18 | 98 | 95 | 107 | 98 |
| 1-6-Inventive | o-BTP-1 | 12.7 | 0.18 | 98 | 96 | 103 | 96 |
| 1-7-Inventive | o-BTP-1 | 15.9 | 0 | 102 | 98 | 110 | 99 |
| 1-8-Inventive | o-BTP-1 | 19.1 | 0.18 | 100 | 99 | 110 | 102 |
| 1-9-Inventive | o-BTP-1 | 15.9 | 0 | 105 | 107 | 111 | 101 |
| 1-10-Inventive | o-BTP-1 | 15.9 | 0.045 | 103 | 100 | 109 | 100 |
| 1-11-Inventive | o-BTP-1 | 15.9 | 0.09 | 102 | 100 | 110 | 100 |
| 1-12-Inventive | o-BTP-1 | 17.5 | 0 | 105 | 103 | 111 | 100 |
| 1-13-Inventive | o-BTP-1 | 17.1 | 0.045 | 104 | 101 | 110 | 101 |
| 1-14-Inventive | o-BTP-1 | 17.5 | 0.09 | 102 | 99 | 110 | 101 |
| 1-15-Inventive | o-BTP-1 | 19.1 | 0 | 105 | 99 | 112 | 99 |
| 1-16-Inventive | o-BTP-1 | 19.1 | 0.045 | 105 | 95 | 111 | 101 |
| 1-17-Inventive | o-BTP-1 | 19.1 | 0.09 | 104 | 99 | 111 | 101 |
| 1-18-Inventive | o-BTP-5 | 13.3 | 0.18 | 98 | 95 | 105 | 99 |
| 1-19-Inventive | o-BTP-5 | 13.3 | 0.09 | 102 | 99 | 107 | 100 |
| 1-20-Inventive | o-BTP-5 | 15.9 | 0 | 105 | 98 | 110 | 102 |
| 1-21-Inventive | o-BTP-5 | 15.9 | 0.09 | 102 | 98 | 106 | 102 |
| 1-22-Inventive | o-BTP-7 | 15.8 | 0 | 106 | 97 | 107 | 100 |
| 1-23-Inventive | o-BTP-7 | 15.8 | 0.09 | 104 | 92 | 103 | 100 | a. a photosensitive silver halide
b. a non-photosensitive source of reducible silver ions,
c. a polymeric binder, and
d. one or more ortho-substituted bis-phenol reducing agents for the reducible silver ions, each of said reducing agents having a bicyclic or tricyclic substituent ortho to one or both hydroxyl groups on the aromatic rings, wherein said one or more of said reducing agents are represented by the following Structure (I)

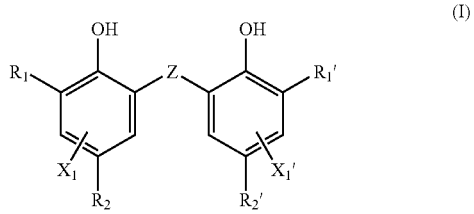

(I)

wherein $R_1$ and $R_1'$ each represent the same or different isobornyl, norbornyl, benzonorbornyl, adamantyl, bicyclo[3.2.1]octyl, benzobicyclo[3.2.1]octyl, benzo[3,4]bicyclo[3.2.1]oct-3-enyl, bicyclo[2.2.2]octyl, bicyclo[3.2.2]nonyl, benzobicyclo[2.2.2]octyl, bicyclo[3.3.1]nonyl, bicyclo[3.3.2]decyl, bicyclo[4.3.1]decyl, bicyclo[4.4.1]undecyl, bicyclo[5.4.1]dodecyl, tricyclo [5.3.1.0(1,5)]undecyl, tricyclo[5.2.1.0(2,6)]decyl, tricyclo[5.4.0.0(2,9)]undecyl groups, $R_2$ and $R_2'$ independently represent a hydrogen atom or a group that can be a substituent on a benzene ring, Z represents —S— or a —CHR$_3$— group wherein $R_3$ represents hydrogen, a substituted or unsubstituted linear, branched, or cyclic, bicyclic, or tricyclic alkyl, cycloalkyl, alkenyl, aralkyl, heterocyclic, aryl, or heteroaryl group, and $X_1$ and $X_1'$ independently represent a hydrogen atom or a group that can be a substituent on a benzene ring.

2. The material of claim 1 wherein said one or more of said reducing agents are represented by the compounds (o-BTBP-1) to (o-BTBP-25) in the following TABLE I:

TABLE I

| Compound | $R_1$, $R_1'$ | $R_2$, $R_2'$ | Z |
|---|---|---|---|
| o-BTBP-1 | Isobornyl | Me | $CH_2$ |
| o-BTBP-2 | Isobornyl | Me | S |
| o-BTBP-3 | Isobornyl | Et | $CH(CH_2CH_2Ph)$ |
| o-BTBP-4 | Isobornyl | Me | 7,7-dimethylbicyclo[2.2.1]hepta-2,5-dien-1-yl |
| o-BTBP-5 | Norbornyl | Me | $CH_2$ |
| o-BTBP-6 | Benzonorbornyl | Me | $CH_2$ |
| o-BTBP-7 | Adamantyl | Me | $CH_2$ |
| o-BTBP-8 | Bicyclo[2.1.1]hexyl | Me | $CH_2$ |
| o-BTBP-9 | Bicyclo[2.1.1]hexyl | Me | CH(n-Pr) |
| o-BTBP-10 | Bicyclo[2.1.1]hexyl | Me | Ph |
| o-BTBP-11 | Bicyclo[3.2.1]octyl | Et | $CH_2$ |
| o-BTBP-12 | Benzobicyclo[3.2.1]octyl | hydroxymethyl | CHMe |
| o-BTBP-13 | Benzo[3,4]bicyclo[3.2.1]oct-3-enyl | Me | S |
| o-BTBP-14 | Bicyclo[2.2.2]octyl | Me | CHBu |
| o-BTBP-15 | Bicyclo[3.2.2]nonyl | Me | CH(i-Pr) |
| o-BTBP-16 | Benzobicyclo[2.2.2]octyl | Et | S |
| o-BTBP-17 | Bicyclo[3.3.1]nonyl | 2-hydroxyethyl | $CH_2$ |
| o-BTBP-18 | Bicyclo[3.3.2]decyl | hydroxymethyl | CHMe |
| o-BTBP-19 | Bicyclo[4.3.1]decyl | iso-Propyl | $CH_2$ |
| o-BTBP-20 | Bicyclo[4.4.1]undecyl | Me | CH(cyclohexyl) |
| o-BTBP-21 | Bicyclo[5.4.1]dodecyl | Me | CH(cyclohexenyl) |
| o-BTBP-22 | Tricyclo[5.3.1.0(1,5)]undecyl | Me | $CH_2$ |
| o-BTBP-23 | Tricyclo[5.2.1.0(2,6)]decyl | Me | $CH_2$ |
| o-BTBP-24 | Tricyclo[5.4.0.0(2,9)]undecyl | Me | $CH_2$ |
| o-BTBP-25 | Norbornyl | Et | S |

3. The material of claim 1 wherein $R_1$ and $R_1'$ are the same or different adamantyl, norbornyl, or isobornyl group, $R_2$ and $R_2'$ are independently hydrogen or an alkyl, cycloalkyl, or aralkyl group, and Z represents —CH($R_3$)— wherein $R_3$ is hydrogen or an alkyl, cycloalkyl, alkenyl, or aryl group, and $X_1$ and $X_1'$ are hydrogen.

4. The material of claim 1 wherein said one or more reducing agents having bicyclic or tricyclic substituents are present in an amount of from about 0.1 to about 0.5 mol/mol of total silver.

5. The material of claim 4 wherein total silver is less than 2 g/m$^2$.

6. The material of claim 1 that provides a black-and-white image and is sensitized to a wavelength of from about 600 to about 1200 nm.

7. The material of claim 1 wherein said photosensitive silver halide is silver bromide or silver iodobromide having up to 50 mol % silver iodide, and said non-photosensitive source of reducible silver ions is a fatty acid silver carboxylate including silver behenate, and said polymeric binder is a hydrophobic polymer binder or a water-dispersible polymeric latex.

8. The material of claim 1 further comprising an additional reducing agent that is a hindered bis-phenol, one or more hindered mono-phenol reducing agents, or one or more hindered bis-phenol reducing agents not incorporating said bicyclic and tricyclic substituents ortho to the hydroxyl group on the aromatic ring, or a combination thereof.

9. The material of claim 1 having the same or different photothermographic layer on both sides of said support, and wherein said one or more reducing agents having bicyclic or tricyclic substituents are present on both sides of said support.

10. The material of claim 1 wherein said binder is gelatin or a water-dispersible polymer latex, and further comprising a development accelerator.

11. The material of claim 1 having one or more photothermographic layers on only one side of said support, and said material having a total absorbance at the exposure wavelength of at least 0.6 on that side of said support, and a total absorbance of at least 0.2 at the exposure wavelength on the backside of said support.

12. The photothermographic material of claim 1 further comprising a contrast enhancing agent.

13. The photothermographic material of claim 1 further comprising a co-developer reducing agent.

14. The photothermographic material of claim 12 wherein said co-developer reducing agent comprises one or more trityl hydrazides, formyl phenyl hydrazides, 2-substituted malondialdehydes, 4-substituted isoxazoles, and substituted acrylonitrile compounds.

15. The photothermographic material of claim 14 further comprising one or more hydroxylamines, alkanolamines, ammonium phthalamate compounds, hydroxamic acids, N-acylhydrazines, or hydrogen atom donor compounds.

16. A method of forming a visible image comprising:
   A) imagewise exposing the photothermographic material of claim 1 to electromagnetic radiation to form a latent image, and
   B) simultaneously or sequentially, heating said exposed photothermographic material to develop said latent image into a visible image.

17. The method of claim 16 wherein said development is carried out for 25 seconds or less.

18. The method of claim 16 wherein said imagewise exposing is carried out using laser imaging at from about 700 to about 950 nm.

19. A black-and-white photothermographic material comprises a support and having on at least one side thereof a photothermographic layer and comprising, in reactive association:

a. a photosensitive silver bromide or iodobromide having up to 40 mol % silver iodide,
   b. a non-photosensitive source of reducible silver ions, comprising at least silver behenate,
   c. a polyvinyl butyral or polyvinyl acetal binder, and
   d. a reducing agent composition comprising one or more reducing agents for the reducible silver ions represented by Structure (II)

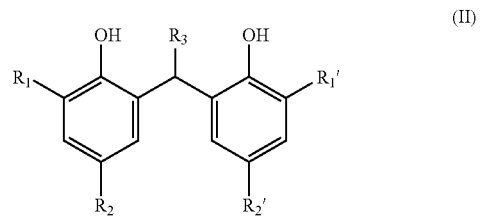

(II)

wherein $R_1$ and $R_1'$ are each a substituted or unsubstituted bicyclic or tricyclic ring groups selected from isobornyl norbornyl, benzonorbornyl, adamantyl, bicyclo[3.2.1]octyl, benzobicyclo[3.2.1]octyl, benzo[3.4]bicyclo[3.2.1]oct-3-enyl, bicyclo[2.2.2]octyl, bicyclo[3.2.2]nonyl, benzobicyclo[2.2.2]octyl bicyclo[3.3.1]nonyl, bicyclo[3.3.2]decyl, bicyclo[4.3.1]decyl, bicyclo[4.4.1]undecyl, bicyclo[5.4.1]dodecyl, tricyclo [5.3.1.0(1.5)]undecyl, tricyclo[5.2.1.0(2,6)]decyl, and tricyclo[5.4.0.0(2,9)]undecyl, $R_2$ and $R_2'$ are each hydrogen, or an alkyl group having from 1 to 6 carbon atoms, and $R_3$ is hydrogen or an alkyl group having from 1 to 12 carbon atoms, said material optionally further comprising a protective overcoat disposed over said photothermographic layer.

20. The material of claim 19 comprising one or more reducing agents that include the compounds (o-BTBP-1) to (o-BTBP-25) in the following TABLE I:

TABLE I

| Compound | $R_1$, $R_1'$ | $R_2$, $R_2'$ | Z |
|---|---|---|---|
| o-BTBP-1 | Isobornyl | Me | $CH_2$ |
| o-BTBP-2 | Isobornyl | Me | S |
| o-BTBP-3 | Isobornyl | Et | $CH(CH_2CH_2Ph)$ |
| o-BTBP-4 | Isobornyl | Me | 7,7-dimethylbicyclo[2.2.1]hepta-2,5-dien-1-yl |
| o-BTBP-5 | Norbornyl | Me | $CH_2$ |
| o-BTBP-6 | Benzonorbornyl | Me | $CH_2$ |
| o-BTBP-7 | Adamantyl | Me | $CH_2$ |
| o-BTBP-8 | Bicyclo[2.1.1]hexyl | Me | $CH_2$ |
| o-BTBP-9 | Bicyclo[2.1.1]hexyl | Me | CH(n-Pr) |
| o-BTBP-10 | Bicyclo[2.1.1]hexyl | Me | Ph |
| o-BTBP-11 | Bicyclo[3.2.1]octyl | Et | $CH_2$ |
| o-BTBP-12 | Benzobicyclo[3.2.1]octyl | hydroxymethyl | CHMe |
| o-BTBP-13 | Benzo[3,4]bicyclo[3.2.1]oct-3-enyl | Me | S |
| o-BTBP-14 | Bicyclo[2.2.2]octyl | Me | CHBu |
| o-BTBP-15 | Bicyclo[3.2.2]nonyl | Me | CH(i-Pr) |
| o-BTBP-16 | Benzobicyclo[2.2.2]octyl | Et | S |
| o-BTBP-17 | Bicyclo[3.3.1]nonyl | 2-hydroxyethyl | $CH_2$ |
| o-BTBP-18 | Bicyclo[3.3.2]decyl | hydroxymethyl | CHMe |
| o-BTBP-19 | Bicyclo[4.3.1]decyl | iso-Propyl | $CH_2$ |
| o-BTBP-20 | Bicyclo[4.4.1]undecyl | Me | CH(cyclohexyl) |
| o-BTBP-21 | Bicyclo[5.4.1]dodecyl | Me | CH(cyclohexenyl) |
| o-BTBP-22 | Tricyclo[5.3.1.0(1,–.5)]undecyl | Me | $CH_2$ |
| o-BTBP-23 | Tricyclo[5.2.1.0(2,6)]decyl | Me | $CH_2$ |
| o-BTBP-24 | Tricyclo[5.4.0.0(2,–.9)]undecyl | Me | $CH_2$ |
| o-BTBP-25 | Norbornyl | Et | S. |

21. The material of claim 20 further comprising an additional reducing agent that is a hindered bis-phenol that does not have said bicyclic or tricyclic substituent ortho to the hydroxyl group on the phenol ring(s) or a hindered mono-phenol.

22. The material of claim 21 wherein said one or more reducing agents comprising said bicyclic or tricyclic substituent ortho to the hydroxyl group on the phenol rings is present in an amount of from about 0.1 and to about 0.4 mol/mol of total silver, and said additional reducing agent is present in an amount of from about 0.001% to about 20% based on total dry weight of the photothermographic layer.

* * * * *